US007896094B2

(12) United States Patent
Arai et al.

(10) Patent No.: US 7,896,094 B2
(45) **Date of Patent: *Mar. 1, 2011**

(54) BEACH CLEANER

(75) Inventors: Shokichi Arai, Wako (JP); Hidekazu Sakai, Wako (JP); Akito Hiramatsu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 222 days.

This patent is subject to a terminal disclaimer.

(21) Appl. No.: 11/727,812

(22) Filed: Mar. 28, 2007

(65) Prior Publication Data

US 2007/0227750 A1 Oct. 4, 2007

(30) Foreign Application Priority Data

Mar. 31, 2006 (JP) ............................ 2006-100481

(51) Int. Cl.
*A01B 43/00* (2006.01)

(52) U.S. Cl. .......................... 171/63; 171/111; 171/135

(58) Field of Classification Search ..................... 171/2, 171/45, 46, 63, 83, 84, 102–107, 111, 134–136, 171/139, 140, 143, 144; 56/200, 203, 204
See application file for complete search history.

(56) References Cited

U.S. PATENT DOCUMENTS

| | | | | |
|---|---|---|---|---|
| 625,669 | A * | 5/1899 | Gorr | 56/200 |
| 3,662,527 | A * | 5/1972 | Breckenridge, Jr. | 56/200 |
| 4,050,518 | A * | 9/1977 | Gilmour | 171/116 |
| 5,242,176 | A * | 9/1993 | Hendrickson | 280/25 |
| 6,019,227 | A * | 2/2000 | May, III | 209/284 |
| 6,623,434 | B2 * | 9/2003 | Chesney et al. | 600/485 |
| 6,675,903 | B2 * | 1/2004 | Ohzeki et al. | 171/10 |
| 6,899,185 | B2 * | 5/2005 | Yagisawa et al. | 171/143 |

FOREIGN PATENT DOCUMENTS

| | | |
|---|---|---|
| JP | 2002-356827 A | 12/2002 |

* cited by examiner

*Primary Examiner*—Thomas B Will
*Assistant Examiner*—Jamie L McGowan
(74) *Attorney, Agent, or Firm*—Birch, Stewart, Kolasch & Birch, LLP

(57) ABSTRACT

A beach cleaner which scrapes up the litter along with sand and captures and deposits the churned up litter and sand in the mesh member. The beach cleaner 50 includes a frame; keel members, a scraper, and a tow portion that are disposed in a front portion of the frame; a mesh member disposed in a rear portion of the frame. The keel members and the scraper churn up litter scattered on sand ground, along with sand, while the beach cleaner travels on a surface of the sand ground by being towed by a towing vehicle. The churned up litter is deposited in the mesh member. Mesh of the mesh member is relatively rough at a front portion thereof in the traveling direction and finer at a rear portion thereof.

19 Claims, 24 Drawing Sheets

BEACH CLEANER

CROSS-REFERENCE TO RELATED APPLICATION

The present application claims priority under 35 U.S.C. §119 to Japanese Patent Application No. 2006-100481, filed Mar. 31, 2006, the entire contents of which are hereby incorporated by reference.

BACKGROUND OF THE INVENTION

1. Field of the Invention

The invention relates to a beach cleaner for collecting various kinds of litter scattered in sand ground such as bathing beach.

2. Description of Background Art

As such a beach cleaner, there is known a device including a frame, a scraper, and a mesh member. The frame is constituted by a plurality of longitudinal members each extending along a direction of traveling and a plurality of transverse members each extending in a transverse direction or substantially perpendicularly to the longitudinal members. The scraper is disposed in a front portion of the frame, and the mesh member is disposed in a rear portion of the frame. While the beach cleaner is traveling over a surface of sand ground by being towed by a towing vehicle with the scraper being partially sunk in the sand, litter of relatively small size are churned up along with sand so that the litter and sand churned up are captured and deposited in the mesh member. See JP-A No. 2002-356827, for instance.

In the thus constructed beach cleaner, the mesh member is detachably attachable to the frame, and selected from a plurality of kinds with different mesh sizes, depending on the conditions of the sand and litter.

However, it is anticipated that a fine mesh member undesirably tends to inhibit the scraped sand from falling therethrough, while a rough mesh member undesirably allows the litter to fall therethrough. There is a demand for removing this drawback.

SUMMARY AND OBJECTS OF THE INVENTION

The invention provides a beach cleaner which scrapes up litter along with sand and captures them by a mesh member, wherein the sand reaching the mesh member is allowed to easily fall while the litter is inhibited from falling.

To address the above issue, according to a first aspect of the present invention, a beach cleaner (e.g., the second beach cleaner 50 in the embodiment) includes a frame (e.g., the frame 53 in the embodiment) including a plurality of longitudinal members (e.g., the longitudinal members 51 in the embodiment) each extending along a traveling direction of the beach cleaner, and a plurality of transverse members (e.g., the transverse members 52*a* and 52*b* in the embodiment) each extending in a transverse direction of the beach cleaner such that the transverse members extend substantially perpendicularly to the longitudinal members.

In addition, a churn-up portion (e.g., the keel members 54 and the scraper 55 in the embodiment) is disposed in a front portion of the frame; a mesh member (e.g., the mesh member 56 in the embodiment) is disposed in a rear portion of the frame; and a tow portion (e.g., the tow portion 67 in the embodiment) is disposed at a front end portion of the frame. The churn-up portion churns up litter scattered on sand ground, along with sand, while the beach cleaner (e.g., the second beach cleaner 50 in the embodiment) is traveling on a surface of the sand ground by being towed by a towing vehicle (e.g., the vehicle 1 in the embodiment), and the churned up litter is deposited in the mesh member, the mesh member having an encircling member (e.g., the encircling member 91 in the embodiment) open at least at a side. Further, the mesh of the mesh member is relatively rough at a front portion thereof in the traveling direction, and the mesh is finer at a rear portion thereof in the traveling direction than that of at least the front portion.

According to a second aspect of the present invention, the mesh member is shiftable relative to the frame in a front-rear direction.

EFFECT OF THE INVENTION

According to the first aspect of the present invention, relatively heavy and damp sand is well sieved off to fall through the relatively rough mesh at the front portion of the mesh member in the traveling direction. On the other hand, relatively light and dry sand reaches the rear portion of the mesh member in the traveling direction along with litter of relatively small size, and is sieved off to fall through the relatively fine mesh, while the litter does not tend to fall therethrough but is caught excellently. That is, irrespective of the conditions of the sand and litter, the sand reaching the mesh member is allowed to easily fall while the litter is inhibited from falling, thereby enhancing the capability of the beach cleaner to collect litter.

According to the second aspect of the present invention, the position of the mesh member is shiftable relative to the frame in the front-rear direction, depending on the state of scraping up of sand and litter, thereby allowing the sand to fall further easily and inhibiting the litter from falling more strictly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
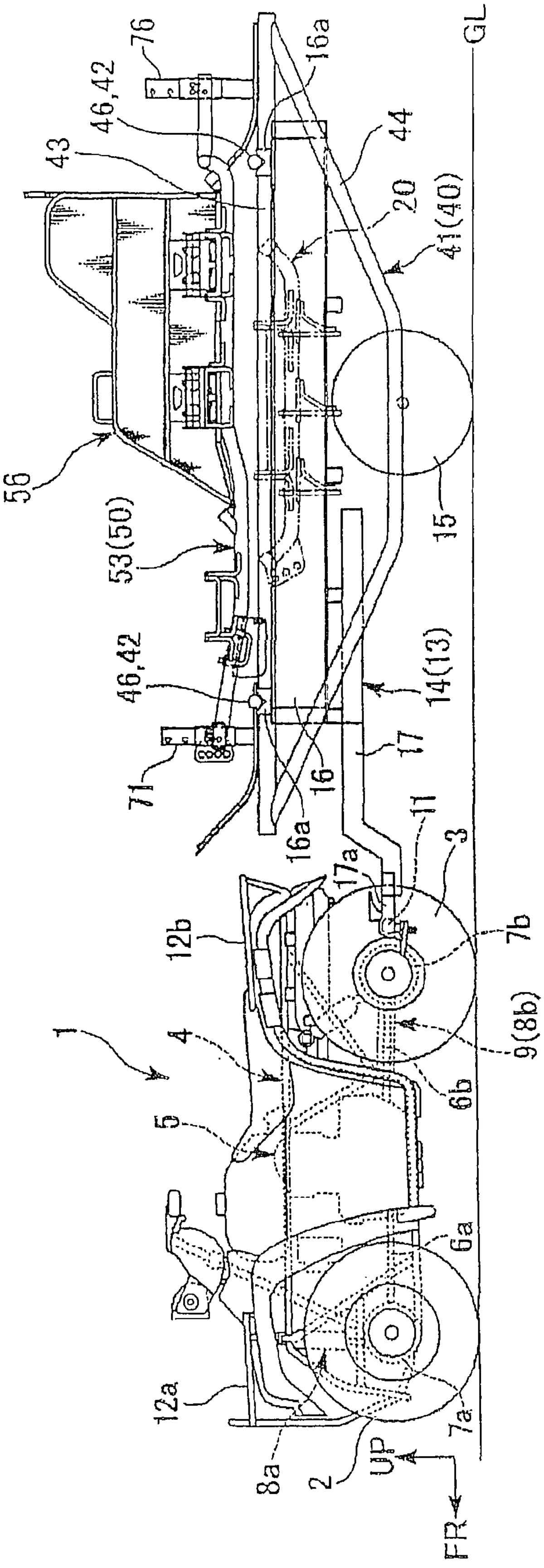
FIG. 1 is a side view of beach cleaners according to an embodiment of the invention and being transported by being mounted on a trailer together with other devices.

A vehicle 1 shown in FIG. 1 has a small-sized and lightweight body, and left and right front wheels 2 and left and right rear wheels 3 which are low pressure balloon tires of relatively large diameter. The front and rear wheels 2, 3 are disposed at a front portion and a rear portion of the body, respectively. The vehicle is provided by a so-called ATV (All Terrain Vehicle) the running performance of which especially in rough terrain is improved by setting large the ground clearance of the vehicle. A body frame 4 of the vehicle 1 has a box-like shape long in a front-rear direction at a middle portion in a transverse direction of the vehicle. In a substantially middle portion of the vehicle body frame 4, an engine 5 as a motor of the vehicle 1 is installed.

The engine, which may be a water-cooled single cylinder engine, for instance, outputs a torque of a crankshaft to front and rear propeller shafts 6*a*, 6*b* via a transmission of meshing gear type. The torque transmitted to the front and rear propeller shafts 6*a*, 6*b* is outputted to the front and rear wheels 2, 3 via front and rear reduction gears 7*a*, 7*b*, respectively.

The vehicle 1 is of so-called semi-automatic transmission type where the gear ratio of the transmission can be electronically changeable. For instance, where a centrifugal clutch is interposed, the gear ratio can be changed merely by manipulation of a change button or others without an operator bothering to operate a clutch. Such a vehicle 1 is more suitable for traveling with high traveling load and traveling at a constant speed.

The front left and right wheels 2 are suspended in a front portion of the body frame 4 by means of a front suspension 8*a* of single wheel suspension type. The rear left and right wheels 3 are suspended in a rear portion of the body frame 4 by means of a rear suspension 8*b* which may be of swing arm type, for instance. At a rear end portion of a swing arm 9 of the rear suspension 8*b*, a trailer hitch 11 for towing a trailer is disposed. Reference numerals 12*a* and 12*b* in the drawings respectively denote a front carrier supported at the front portion of the body frame 4 and a rear carrier supported at the rear portion of the body frame 4.

The vehicle 1 can tow first and second beach cleaners 20, 50, which will be described later, and a trailer 13 for carrying a litter collecting station 40.

For instance, the trailer 13 is constructed to have a body frame 14, a pair of wheels 15, i.e., a left wheel and a right wheel, a carrier 16 disposed on the body frame 14, and a tow arm 17. The left and right wheels are disposed at two opposed sides of a lower portion of the body frame 14, and the carrier 16 have a vertically thin box-like shape open at the upper side. The tow arm 17 extends frontward from the under side of a front portion of the body frame 14. At a front end portion of the tow arm 17, a hitch coupler 17*a* which is to engage the trailer hitch 11 is disposed.

On an upper surface of the carrier 16 and at left and right ends at each of a front side and a rear side, a receiving member 16*a* for supporting each of connecting pipes 46 (described later) of the litter collecting station 40 is disposed. Each of the receiving members 16*a* has a V-shaped recess open upward. The connecting pipes 46 of the litter collecting station 40 as inverted and mounted on the trailer 13 are fitted in the recesses to be held thereby. On the litter collecting station 40 as inverted and mounted on the trailer 13, the second beach cleaner 50 is mounted, for instance in a state where the second beach cleaner 50 is engaged with a ground-contact member 43 and thus restricted from displacing, and the first beach cleaner 20 is mounted, for instance in a state where the first beach cleaner 20 is accommodated in the carrier 16.

Figure 2:
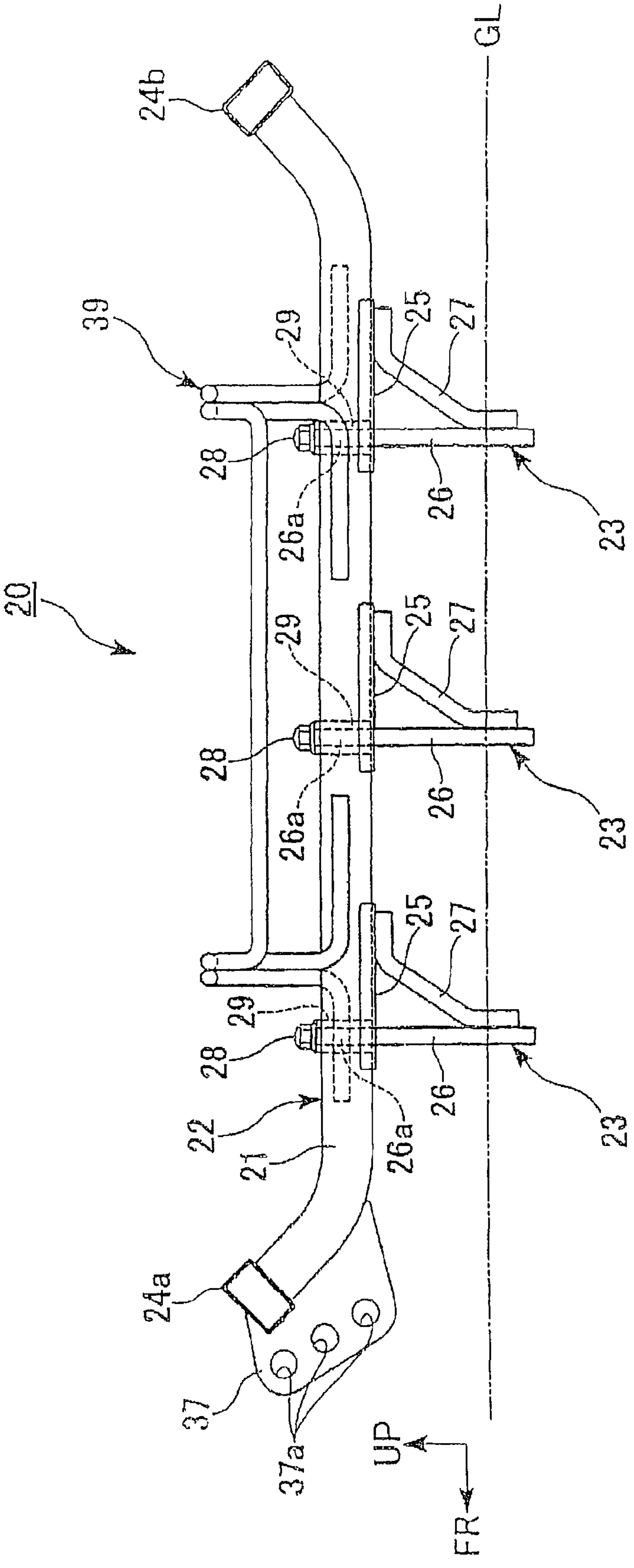
FIG. 2 is a side view of a first beach cleaner according to the embodiment.

It is noted that each of the beach cleaners 20, 50 and the litter collecting station 40 is in the state mounted on the trailer 13 in FIG. 1, but is in use on sand ground in FIG. 2 and the following drawings unless otherwise noted. In some drawings, line GL represents the ground surface (or upper surface of the sand), and line CL represents a transverse centerline of the vehicle 1, the beach cleaners 20, 50 towed thereby, and the litter collecting station 40 through which the vehicle 1 and the beach cleaners 20, 50 pass. (Hereinafter, the vehicle 1, the beach cleaners 20, 50, and the litter collecting station 40 may be collectively referred to as "vehicle and other devices".) Arrow FR indicates the front side in the traveling direction (or front-rear direction) of the vehicle and other devices, arrow UP indicates the upper side in the vertical direction of the vehicle and other devices, and arrow LH indicates the left side in the transverse direction of the vehicle and other devices.

Each of the beach cleaners 20, 50 is towed by the vehicle 1 to travel in a sand ground, such as one at seacoast (sandy beach), during which the beach cleaner 20, 50 picks up various kinds of litter scattered on the sand. The litter picked up by the beach cleaners 20, 50 are collected together into the litter collecting station 40 which is installed at a place in the sand ground. Each of the beach cleaners 20, 50 and litter collecting station 40 is produced by suitably assembling a plurality of kinds of steel products, such as those of stainless steel, by a combining method such as welding. It may be arranged such that each of the beach cleaners 20, 50 is towed by a tractor.

Figure 3:
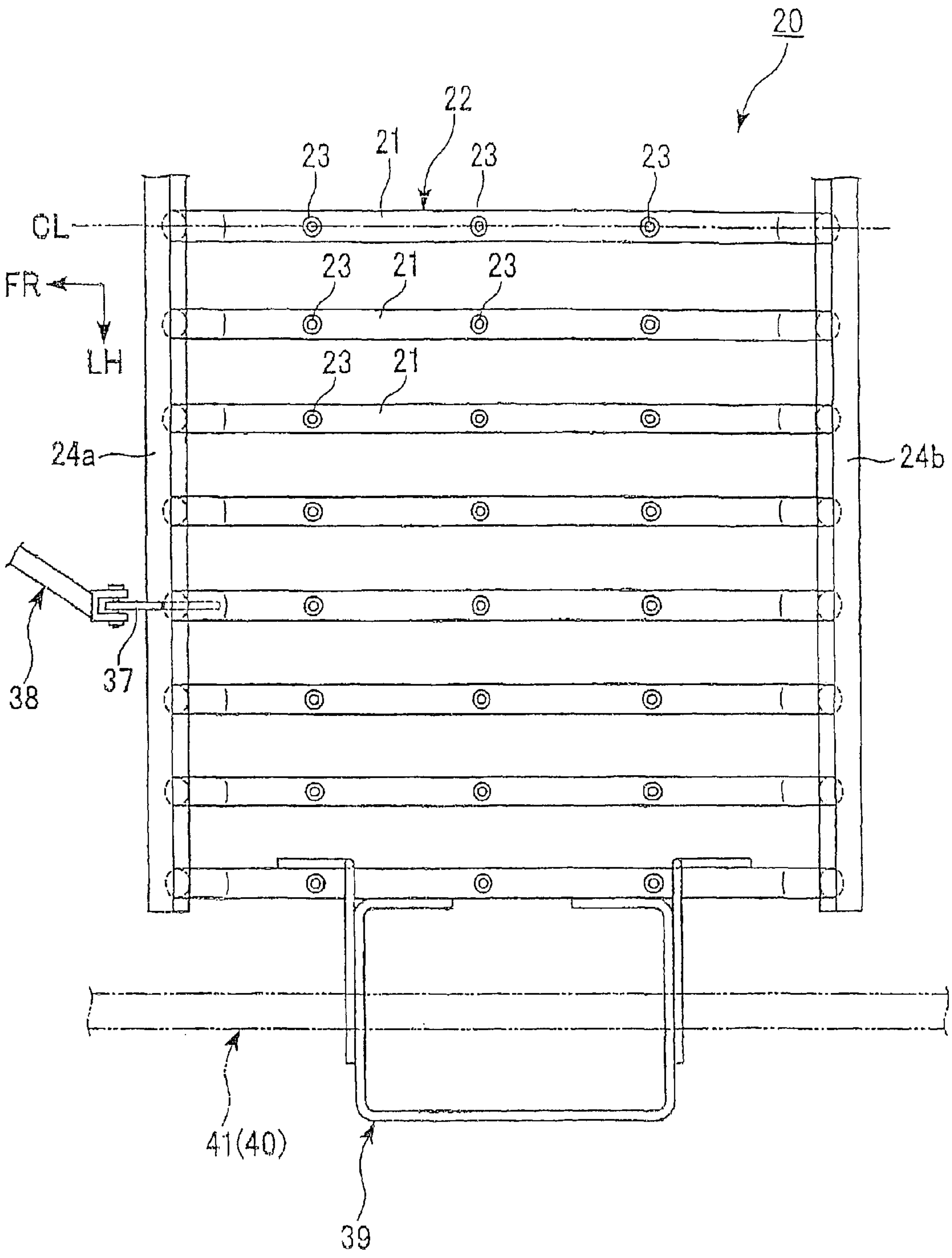
FIG. 3 is a top view of the first beach cleaner shown in FIG. 2.

As shown in FIGS. 2 and 3, the first beach cleaner 20 is constructed such that a plurality (e.g., 15) of longitudinal members 21 each extending along the traveling direction are arranged in the transverse direction (or left-right direction) at regular intervals to form a frame 22 like a duckboard, and a plurality of sand pins 23 are detachably attached to each of the longitudinal members 21 such that the sand pins 23 protrude downward. The first beach cleaner 20 is constructed symmetrically in the transverse direction.

Each of the longitudinal members 21 is provided by a circular steel tube (or alternatively a rectangular steel tube) disposed to extend in the front-rear direction and having a front end portion bent obliquely up frontward or backward. A plurality of such longitudinal members 21 are arranged in the left-right direction to entirely overlap one another in side view. Front ends of the longitudinal members 21 are abutted and joined, from the obliquely rear lower side, to a front transverse member 24*a* extending along the left-right direction, which may be a rectangular steel tube. Rear ends of the longitudinal members 21 are abutted and joined, from the obliquely front lower side, to a rear transverse member 24*b* extending along the left-right direction, which may be a rectangular steel tube.

The frame 22 constituted by the longitudinal members 21 and the transverse members 24*a*, 24*b* has a rectangular shape long in the transverse direction in top view. The transverse dimension of the frame 22 is equal to or slightly larger than the transverse dimension of the vehicle 1, and smaller than the transverse dimension between a left side structure 41 and a right side structure 41 of the litter collecting station 40 which will be described later.

It is arranged such that the sand pin 23 can be attached to each longitudinal member 21 at each of a front portion, a middle portion, and a rear portion thereof. That is, a plurality of sand pins 23 can be disposed in three rows, i.e., a front row, a middle row, and a rear row. According to this arrangement, the travel resistance during traveling at low speed is lowered, and it is possible to further lower the travel resistance by reducing the number of the sand pins 23 depending on the firmness of the sand ground surface. The amount of protrusion of the sand pins 23 from an under surface of the frame 22 is set at 100 mm at most so as to reduce the impact to the ecosystem in the sand.

When the thus constructed first beach cleaner 20 travels in the sand ground, relatively large-sized litter scattered (ropes, nets, driftwood, and others) are raked by being caught at or entangled around the sand pins 23.

Figure 4A:
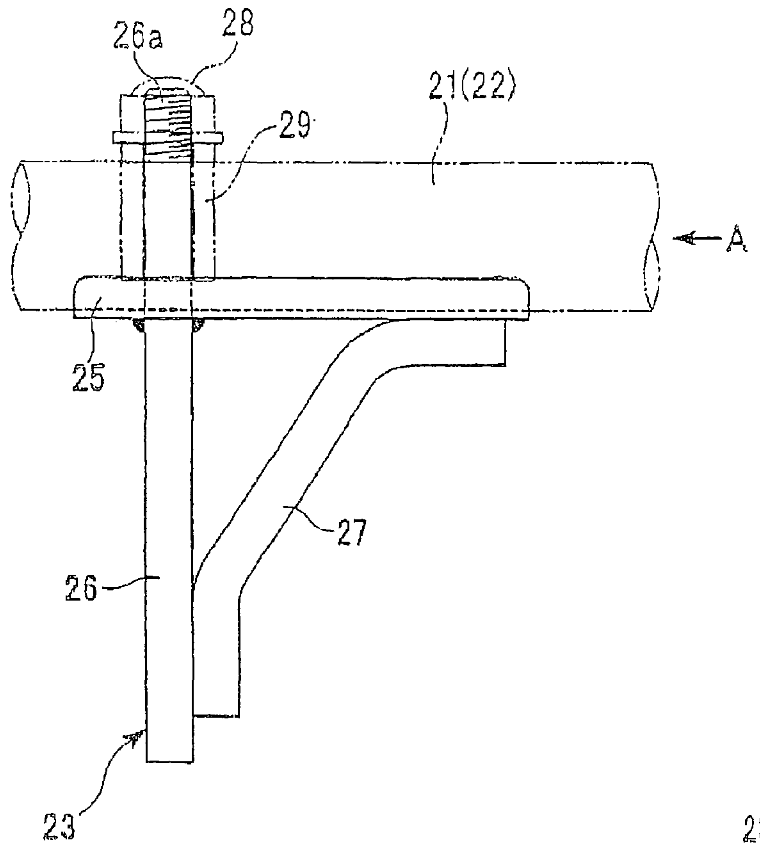
FIGS. 4(*a*) and 4(*b*) are explanatory views of a sand pin of the first beach cleaner, in which FIG. 4(*a*) is a side view and FIG. 4(*b*) is a view as seen in the direction of arrow A in FIG. 4(*a*)
Figure 4B:
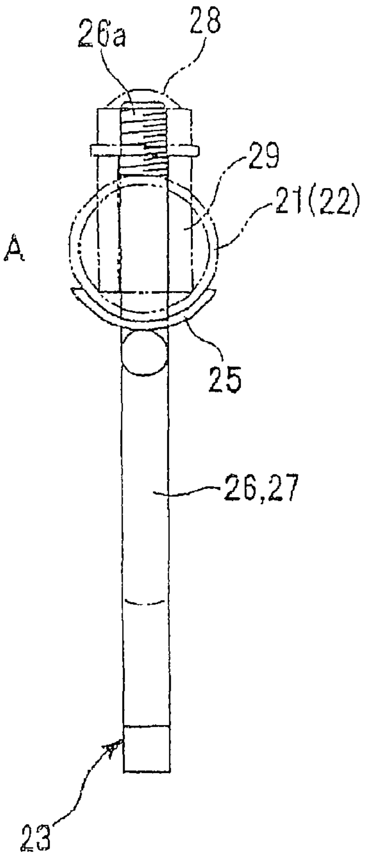

Referring further to FIG. 4, each sand pin 23 has a plate-like member 25 curved to fit an outer surface of a lower portion of the longitudinal member 21, a pin main body 26 vertically extending through the plate-like member 25, and a brace-like support member 27 extending between a lower portion of the pin main body 26 and a rear portion of the plate-like member 25. The sand pin 23 has a triangular shape narrower on the lower side in side view. An upper portion of the pin main body 26 is formed as an externally threaded portion 26*a*. With the externally threaded portion 26*a* being inserted through the longitudinal member 26 from the under side to protrude upward from the longitudinal member 21, the plate-like member 25 is contacted with an under surface of the longitudinal member 21. In this state, a cap nut 28 is threadably mounted on the externally threaded portion 26*a* and tightened, thereby fixing the sand pin 23 on the longitudinal member 21. At a position in the longitudinal member 21 where the pin main body 26 extends through, a cylindrical collar 29 is inserted and fixed.

Figure 5A:
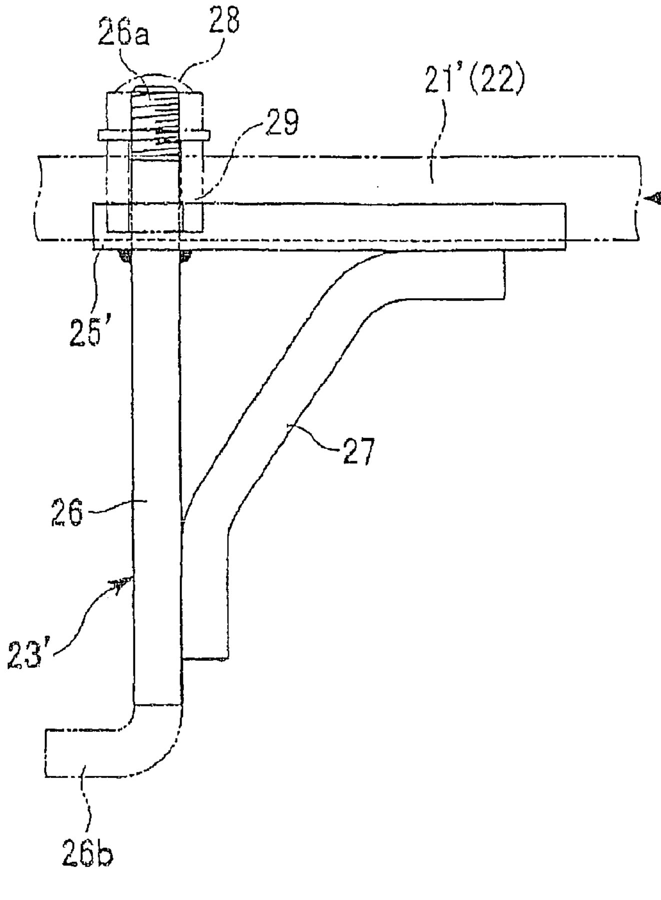
FIGS. 5(*a*) and 5(*b*) are explanatory views of a modification of the sand pin, in which FIG. 5(*a*) is a side view and FIG. 5(*b*) is a view as seen in the direction of arrow A in FIG. 5(*a*)
Figure 5B:
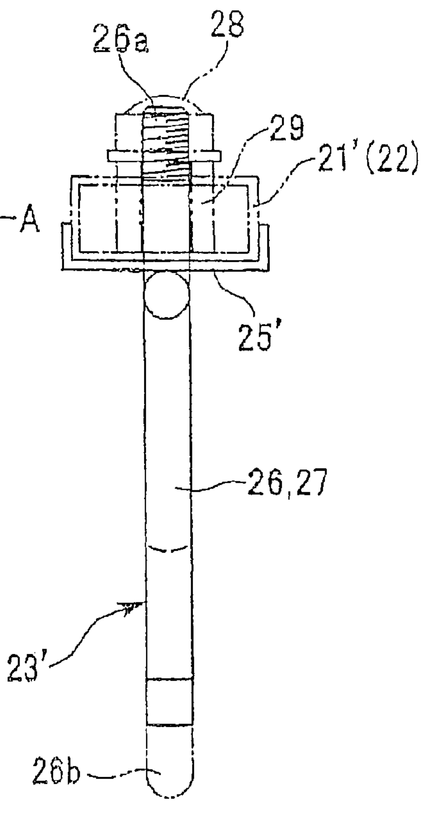

As FIG. 5 shows, where the longitudinal member is provided by a rectangular steel tube 21', a sand pin 23' corresponding thereto is employed. That is, the sand pin 23' has a plate-like member 25' which is square U-shaped in cross section in order to fit an outer surface of a lower portion of the longitudinal member 21'. With the plate-like member 25' fitted on the lower portion of the longitudinal member 21', the cap nut 28 is threadably mounted on the externally threaded portion 26*a* and tightened, thereby fixing the sand pin 23' on the longitudinal member 21'. The width of a cross-sectional shape of the longitudinal member 21' in the left-right direction is relatively large so as to improve the slidability of the first beach cleaner on sand ground. In a case where a lower end portion of the pin main body 26 is bent frontward to form a bent portion 26*b*, the capability of collecting litter is further enhanced.

Figure 6:
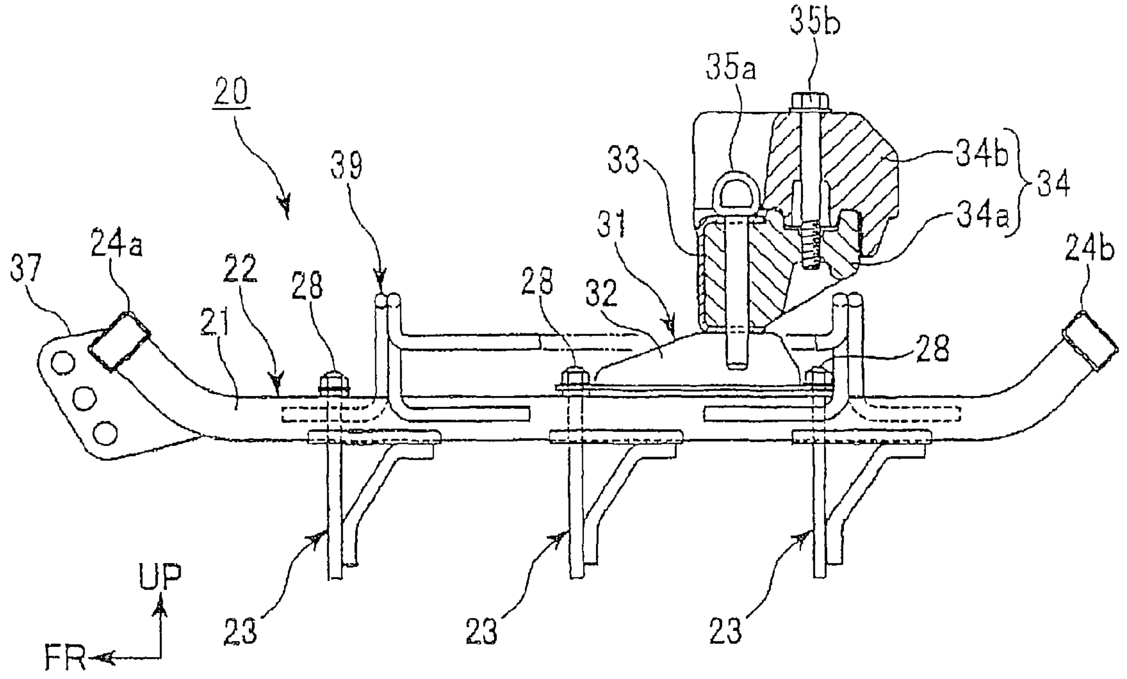
FIG. 6 is a side view of the first beach cleaner with a weight mounting portion attached thereto.
Figure 7:
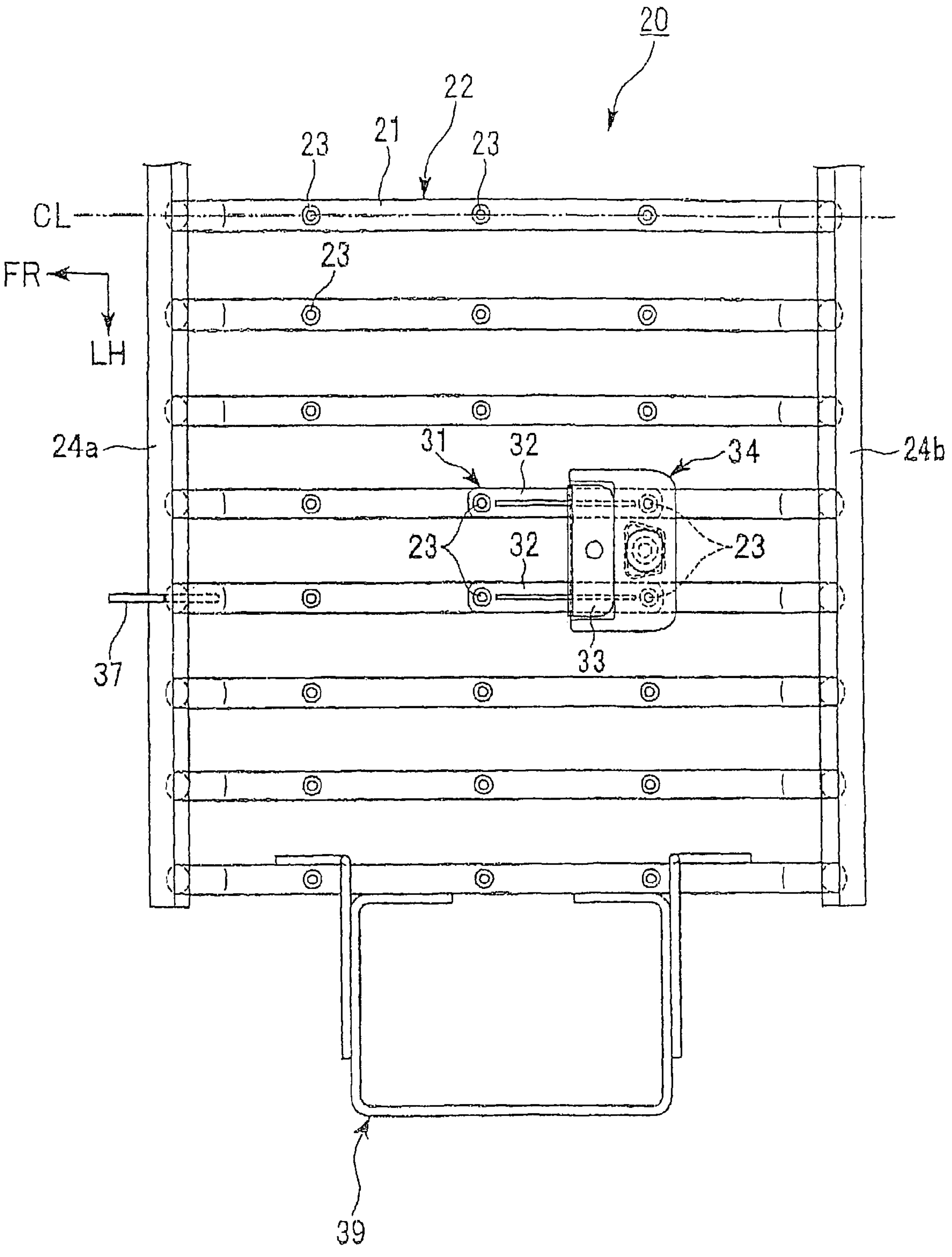
FIG. 7 is a top view corresponding to FIG. 6.

As FIGS. 6 and 7 show, on the frame 22 of the first beach cleaner 20, there can be disposed a weight mounting portion 31 for adjusting an amount of sinking of the sand pins 23 into the sand.

Figure 8A:
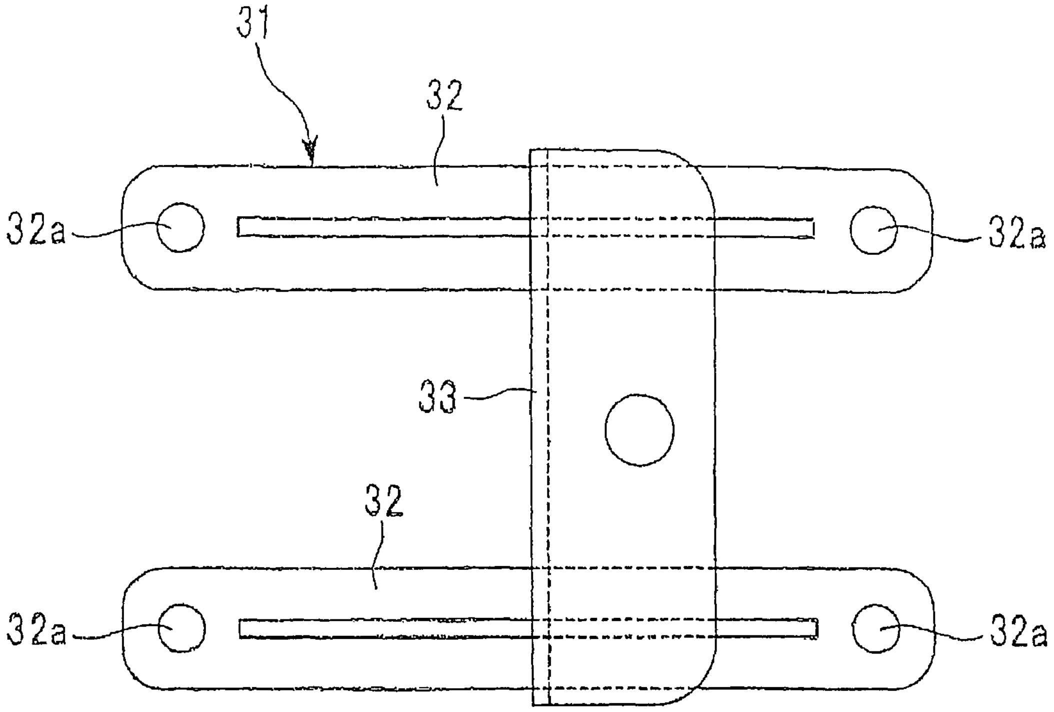
FIG. 8 are explanatory views of the weight mounting portion shown in FIG. 6, in which FIG. 8(*a*) is a top view and FIG. 8(*b*) is a side view thereof.
Figure 8B:
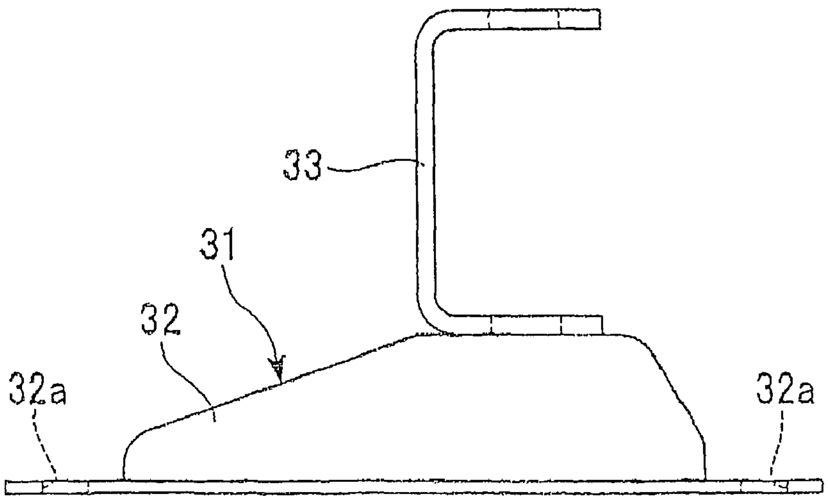

Referring further to FIG. 8, the weight mounting portion 31 is constructed such that two base members 32 arranged in the left-right direction are integrally connected by means of a support bracket 33. Each base member 32 is provided by a longitudinal member long in the front-rear direction. The base members 32 are interspaced from each other in the left-right direction by the same distance as the distance of two adjacent longitudinal members 21 of the frame 22 in the left-right direction. In each of a front end portion and a rear end portion of each base portion 32, there is formed an insertion hole 32*a* through which the externally threaded portion 26*a* of a corresponding one of the sand pins 23 that are attached to the frame 22 in the front-rear direction arrangement. The support bracket 33, which has a square U-shaped cross-sectional shape open rearward and extends in the left-right direction, is disposed to extend across longitudinally middle portions of the base portions 32.

The weight mounting portion 31 constructed as described above can be attached to the frame 22 at the position corresponding to the sand pins 23, by screwing using the sand pin 23. However, even at a position not corresponding to the sand pins 23, the weight mounting portion 31 can be attached by using suitable bolts or others. Thus, the number of the weight mounting portion(s) 31 mounted on the frame 22 and the position(s) on the frame 22 at which the weight mounting portion(s) 31 is/are mounted are not limited.

Figure 9:
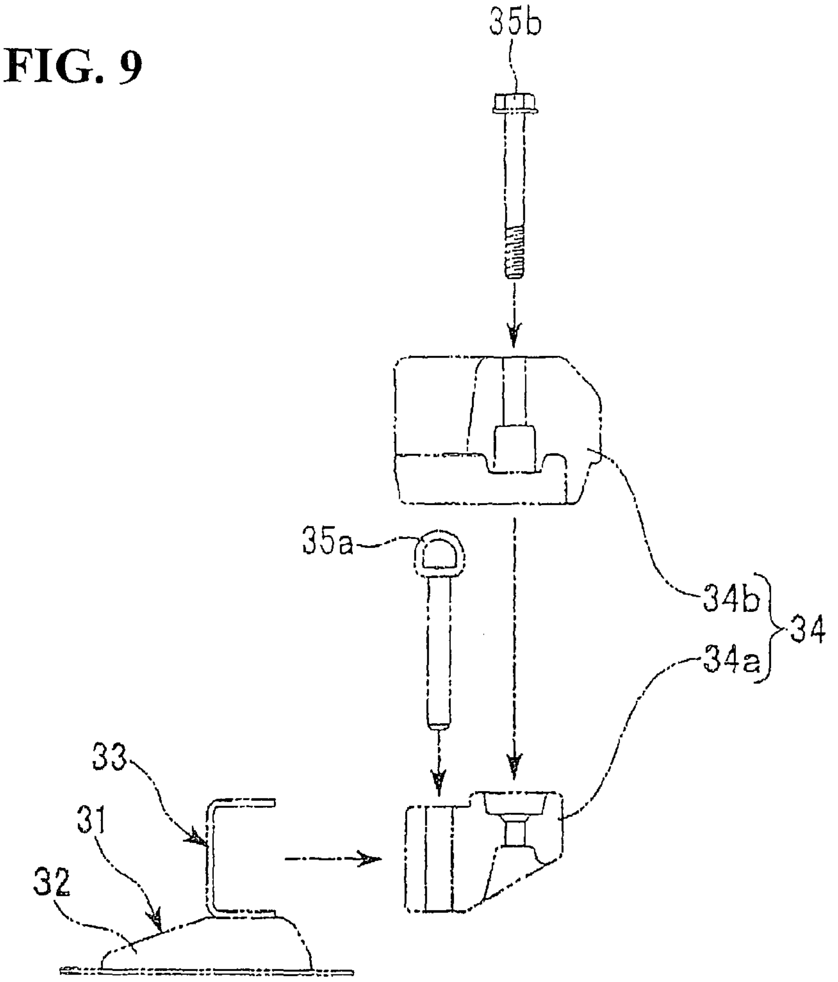
FIG. 9 is an explanatory exploded view showing the weight mounting portion shown in FIG. 6 and a weight attached thereto.

Referring further to FIG. 9, a weight 34 supported by the weight mounting portion 31 has a block construction having a lower block 34*a* fitted in the support bracket 33 from the rear side and an upper block 34*b* fitted on the lower block 34*a* from the upper side.

With a front end portion of the lower block 34*a* being disposed inside the support bracket 33, the lower block 34*a* is connected and fixed to the support bracket 33 by means of an engaging pin 35*a* vertically inserted through the front end portion of the lower block 34*a* and the support bracket 33. With a lower portion of the upper block 34*b* fitted on an upper portion of the lower block 34*a*, the upper block 34*b* is connected and fixed to the lower block 34*a* by means of a connecting bolt 35*b* vertically inserted through the upper and lower blocks 34*a*, 34*b*.

Figure 10:
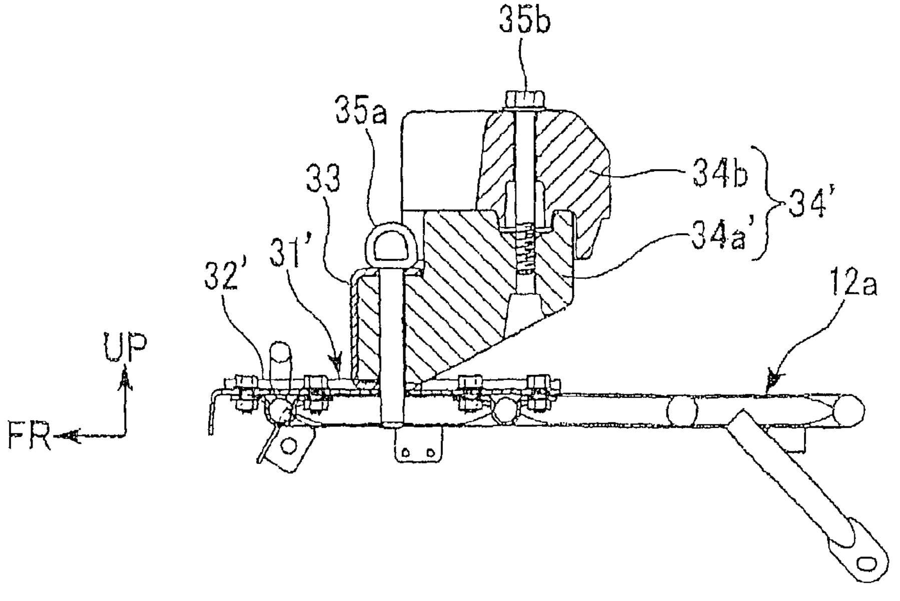
FIG. 10 is a side view showing a weight mounting portion as attached to a front carrier of a towing vehicle.
Figure 11:
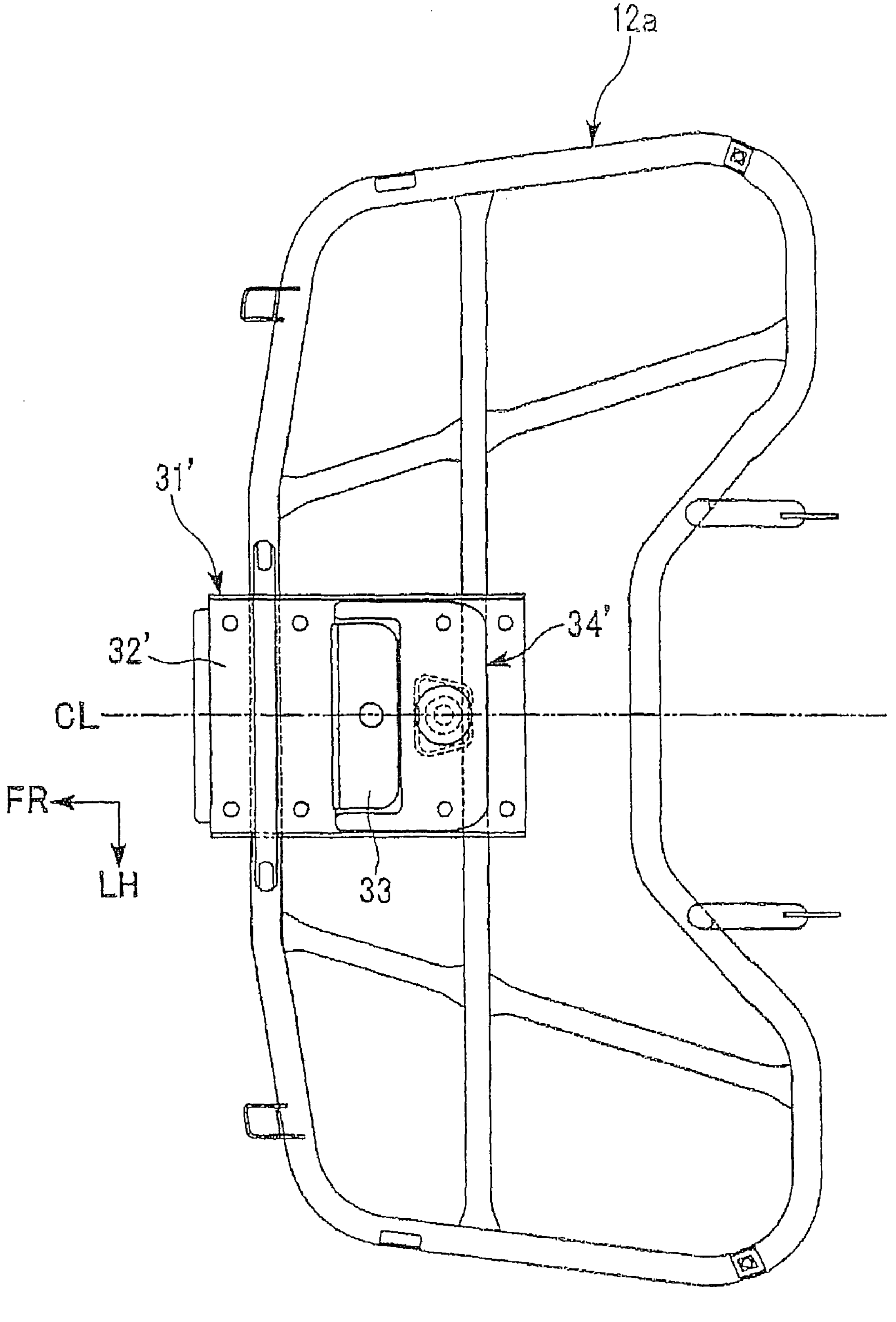
FIG. 11 is a top view corresponding to FIG. 10.

As FIGS. 10 and 11 show, a predetermined weight mounting portion 31' can be disposed on the front carrier 12*a* of the vehicle 1 so that even where the travel resistance increases due to the weight 34 mounted on the first beach cleaner 20 or for other reasons, the load on the front wheels is sufficiently high to give sufficient driving force.

The weight mounting portion 31' is constructed such that a support bracket 33 similar to that of the weight mounting portion 31 described above is integrally disposed on a base portion 32' conforming to an upper surface of the front carrier 12*a*. The base portion 32' is a plate-like member oblong rectangular in top view, and detachably attached, at the under side of a front portion and a rear portion thereof, to pipe members of the front carrier 12*a* extending in the left-right direction.

Figure 12:
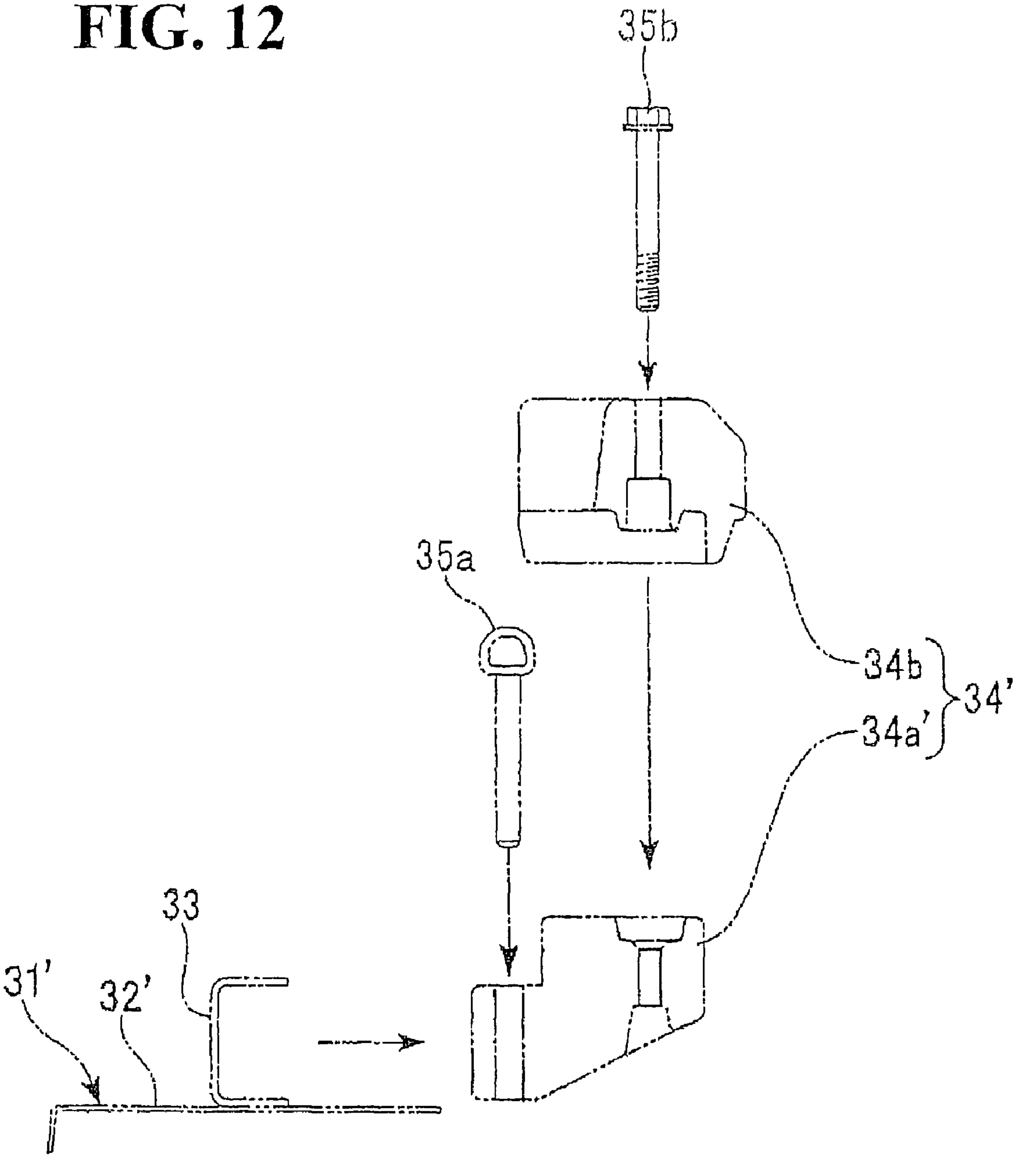
FIG. 12 is an explanatory exploded view showing the weight mounting portion shown in FIG. 10 and a weight attached thereto.

Referring further to FIG. 12, a weight 34' supported by the weight mounting portion 31' has a block construction having a lower block 34*a*' fitted in the support bracket 33 from the rear side and the upper block 34*b* fitted on the lower block 34*a*' from the upper side.

In the lower block 34*a*', an amount of rearward extension is slightly increased as compared with the lower block 34*a*, and a front end portion of the lower block 34*a*' is connected and fixed to the support bracket 33 by means of the engaging pin 35*a*. With a lower portion of the upper block 34*b* fitted on a rear portion of an upper portion of the lower block 34*a*', the upper and lower blocks 34*a*', 34*b* are connected and fixed to each other by means of the connecting bolt 35*b*. The weight of the weight 34' is set larger than that of the weight 34. In a case where the wheels slip on the sand ground, a tire chain may be attached on the wheels.

Figure 25:
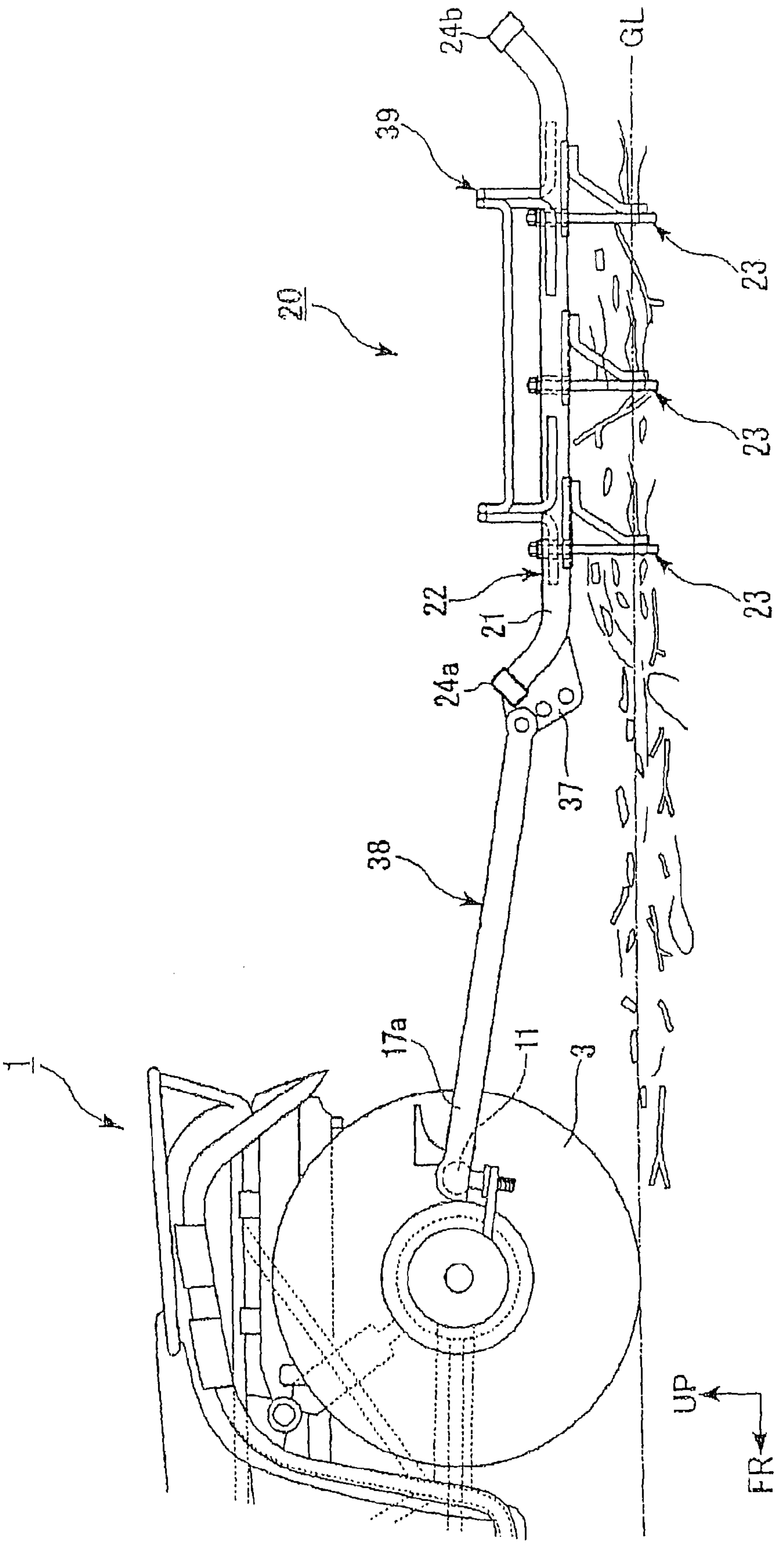
FIG. 25 is a side view of the first beach cleaner as towed by the vehicle.

Referring to FIGS. 2 and 3, a tow portion 37 for use in towing the first beach cleaner 20 by the vehicle 1 is disposed on the front side of each of fourth ones of the longitudinal members 21 of the frame 22 as counted from left and right. Each tow portion 37 is a thick plate-like member extending to perpendicularly intersect the left-right direction, and has a plurality (e.g., three) of connecting holes 37*a* that are arranged in a line along an inclination of the front end portion of the longitudinal member 21. A first one of two opposite ends of a tow rod 38 is connected to the trailer hitch 11 of the vehicle 1 and a second one of the two opposite ends of the tow rod 38 is engaged with one of the connecting holes 37*a*, so that the first beach cleaner 20 is towed by the vehicle 1 through the tow rod 38 (see FIG. 25).

Figure 14:
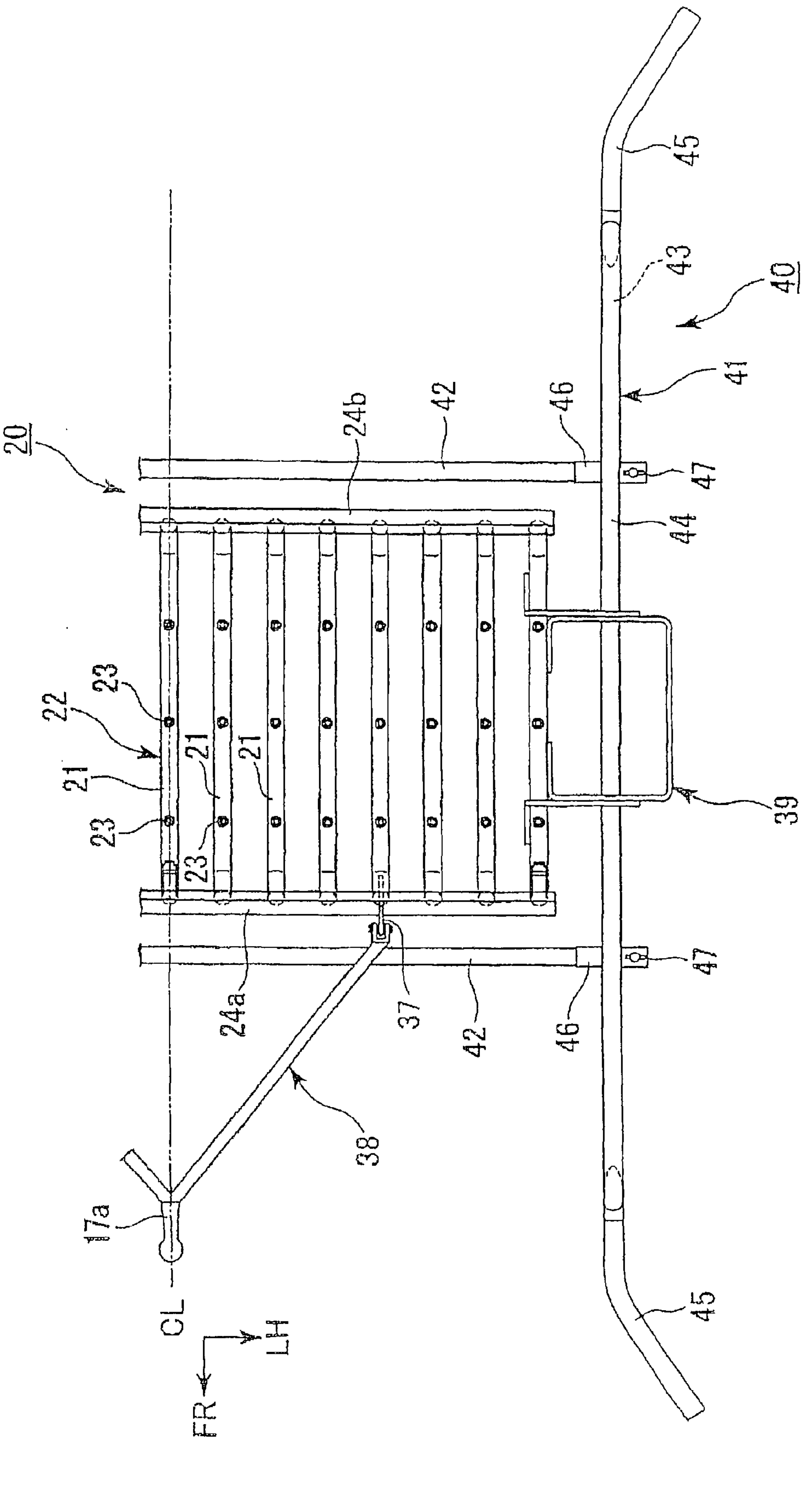
FIG. 14 is a top view corresponding to FIG. 13.

By the selection of the one connecting hole 37*a* with which the second end of the tow rod 38 is engaged, the tow position can be set at the most suitable one that corresponds to the amount of sinking of the first beach cleaner 20 into the sand and other conditions. Referring further to FIG. 14, the tow rod 38 has the first end connected to the trailer hitch 11 and extends therefrom toward the left and right tow portions 37 into a V- or Y-like shape in top view. At the first end of the tow rod 38, there is disposed the hitch coupler 17*a* to engage the trailer hitch 11.

From each of a left and a right end of the frame 22, a lift arm 39 protrudes outward, i.e., leftward and rightward, respectively. For instance, each lift arm 39 is a frame-like member that is rectangular in top view and substantially horizontal at its middle portion in the left-right direction with an inner portion and an outer portion thereof in the left-right direction being respectively bent obliquely downward toward the inside and outside. The dimension between outer lateral ends of the left and right lift arms 39 is larger than the dimension of the left and right side structures 41 of the litter collecting station 40 in the same direction. When the first beach cleaner 20 towed by the vehicle 1 enters a space between the left and right side structures 41, the left and right lift arms 39 get upon the left and right side structures 41 to lift the first beach cleaner 20 by a predetermined amount. The distance between the left and right side structures 41 is larger than the transverse dimension of the vehicle 1, and thus the vehicle 1 can travel through the space between the left and right side structures 41.

Figure 13:
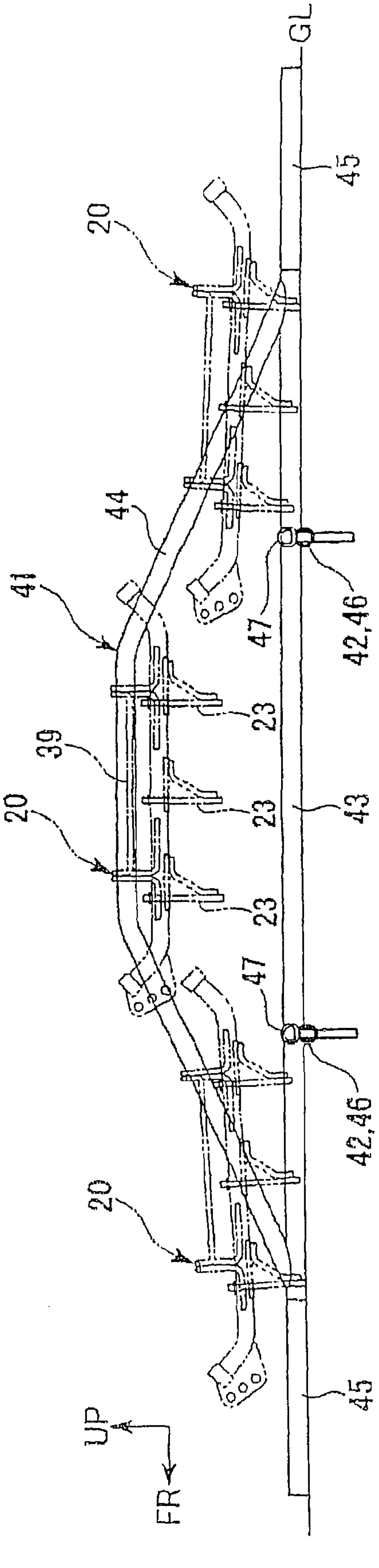
FIG. 13 is a side view of a litter collecting station according to the embodiment.

As FIGS. 13 and 14 show, when the first beach cleaner 20 is lifted at the litter collecting station 40 as described above, the sand pins 23 separate from the upper surface of the sand ground by a sufficient distance and the litter raked by the sand pins 23 fall onto the sand ground so that the litter can be gathered to be collected.

The litter collecting station 40 is formed by integrally connecting the left and right side structures 41 by means of a pair of connecting members 42, i.e., a front connecting member and a rear connecting member, and may be symmetric in both of the front-rear and left-right directions, for instance.

Each of the left and right side structures 41 is constructed such that a guide member 44, which may be provided by a circular steel tube and is gently angled at two points to be substantially symmetric in the front-rear direction in side view, is disposed on a bar-like ground-contact member 43, which may be provided by a circular steel tube and extends in the front-rear direction, and front end portions and rear end portions of these members 43, 44 are respectively integrally connected.

A foot member 45 is detachably attached to each of a front end and a rear end of each of the left and right ground-contact members 43. In top view, the foot member 45 attached to the front end is bent outward toward the front side, and the foot member 45 attached to the rear end is bent outward toward the rear side. The foot members 45 and the ground-contact members 43 together contact the sand ground, thereby increasing the contact area of the litter collecting station 40. Hence, the litter collecting station 40 can be stably installed.

Figure 15:
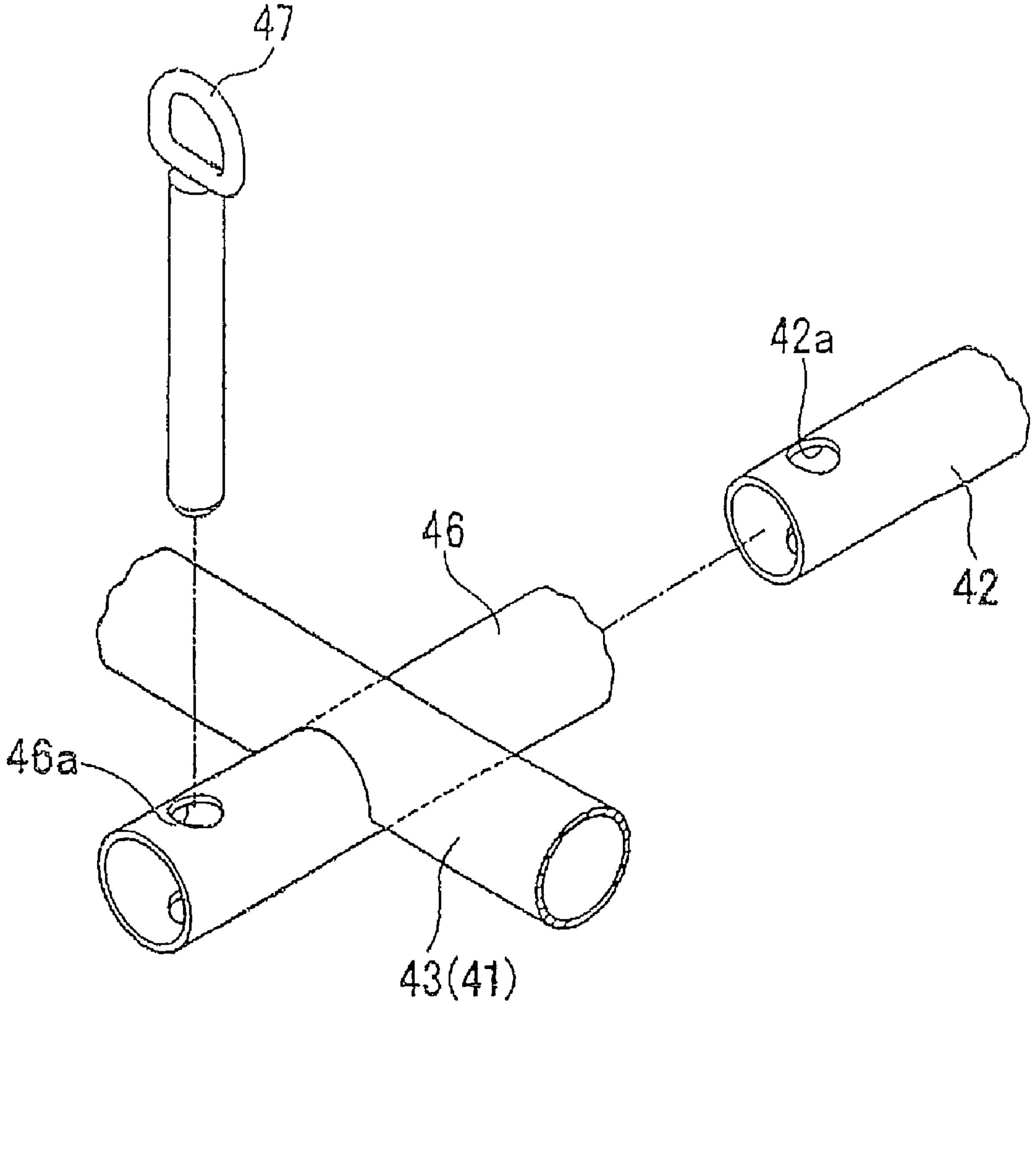
FIG. 15 is an explanatory perspective view of a dividable structure in the litter collecting station.

Referring further to FIG. 15, the connecting members 42 may be provided by circular steel tubes extending in the left-right direction, for instance. The connecting members 42 integrally connect the left and right side structures 41 such that end portions of the connecting members 42 are detachably inserted into respective connecting pipes 46 disposed under front and rear portions of the ground-contact members 43. That is, the litter collecting station 40 is dividable into a plurality of parts (namely, the left and right side structures 41 and the front and rear connecting members 42) due to its relatively large size.

The connecting pipes 46 at the front and rear portions of the ground-contact members 43 are provided by relatively short circular steel tubes extending in the left-right direction. Each connecting pipe 46 is integrally combined with the ground-contact member 43 with an upper circumferential portion of the connecting pipe 46 fitted on a cutout on the under side of the ground-contact member 43. That is, the connecting pipes 46 protrude downward from under surfaces of the ground-contact members 43, so that when the litter collecting station 40 is installed on the sand ground, the connecting pipes 46 slightly sink into the sand to inhibit the litter collecting station 40 from moving.

In the assembled state where the end portion of each connecting member 42 is inserted in the connecting pipe 46 by a predetermined amount (for instance, an outer side end of the connecting pipe 46 and that of the corresponding connecting member 42 match), a vertical through-hole 42*a* formed in the connecting pin 42 and a vertical through-hole 46*a* formed in the connecting pipe 46 align, at a position on the outside of left or right of the ground-contact member 43, for instance, and a prescribed engaging pin 47 is inserted through the vertical through-holes 42*a*, 46*a*, thereby connecting the connecting member 42 and the ground-contact member 43 such that the members 42, 43 can not be separated from each other when assembled as described above.

The engaging pin 47 inserted through the connecting member 42 and the connecting pipe 46 is further inserted into the sand by a predetermined amount. That is, the engaging pin 47 restricts the litter collecting station 40 from moving from the predetermined position while the litter collecting station 40 is in the installed state. By removing the engaging pin 47 and pulling the connecting member 42 from the connecting pipe 46, the litter collecting station 40 can be divided into the left and right side structures 41 and the front and rear connecting members 42.

Figure 16:
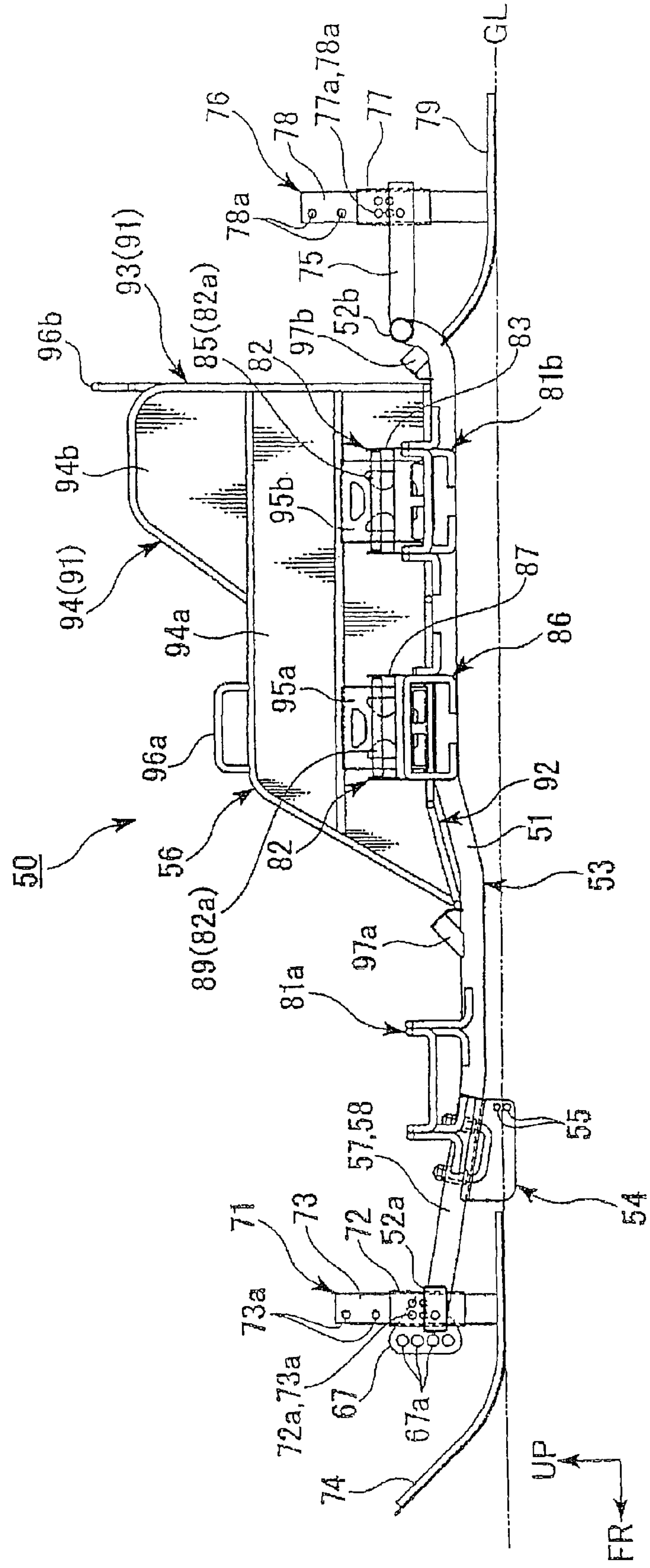
FIG. 16 is a side view of a second beach cleaner according to the embodiment.
Figure 17:
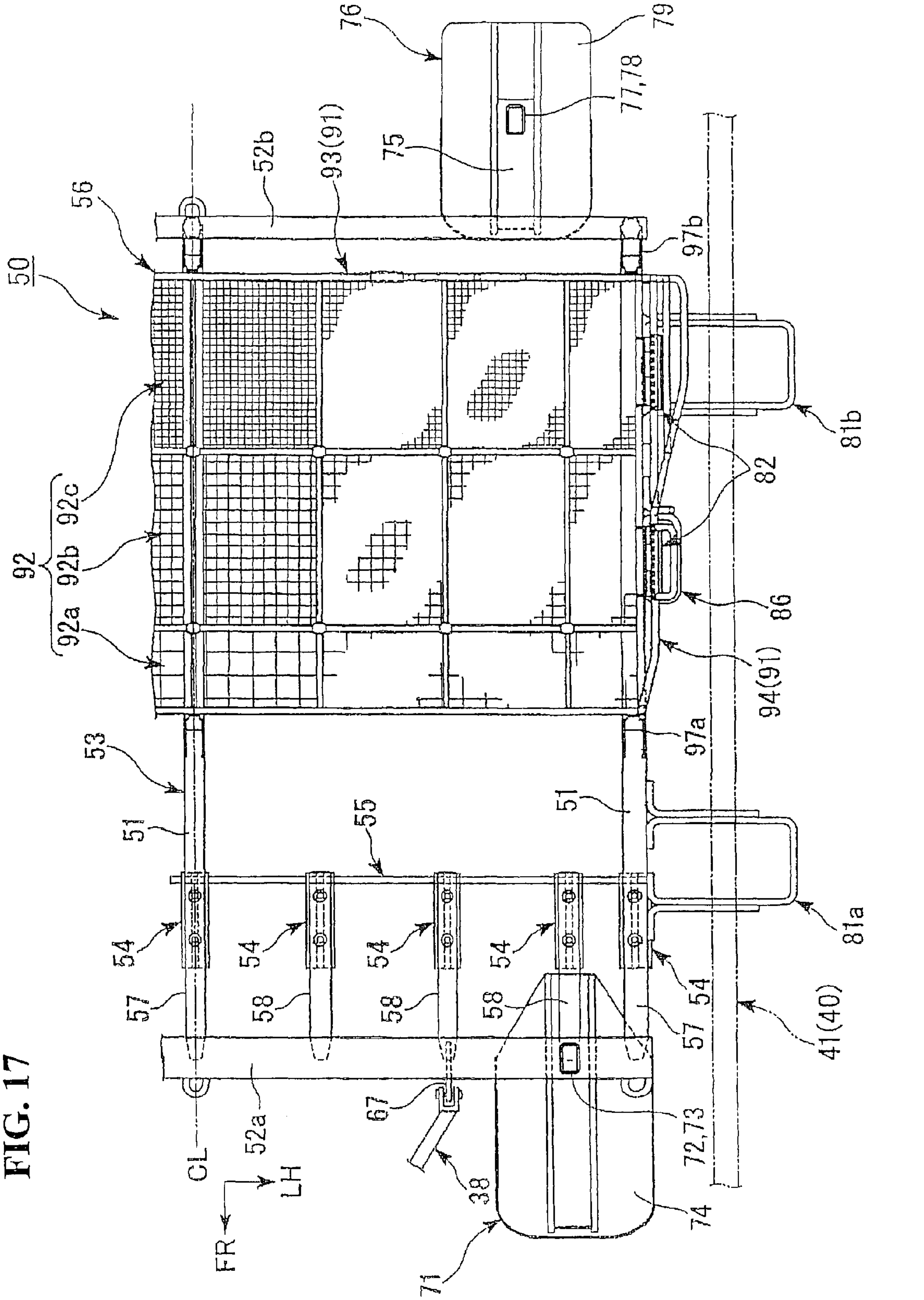
FIG. 17 is a top view corresponding to FIG. 16.

As FIGS. 16 and 17 show, the second beach cleaner 50 includes a frame 53 mainly composed of a plurality (e.g., three) of longitudinal members 51 each extending along the traveling direction of the vehicle and front and rear transverse members 52*a*, 52*b* each extending in a transverse direction (left-right direction) to substantially perpendicular intersect the longitudinal members 51. The second beach cleaner 50 further includes keel members 54 and scraper 55 that are disposed in a front portion of the frame 53 and will be described later, and a mesh member 56 (described later) disposed in a rear portion of the frame 53. The second beach cleaner 50 is also symmetric in the left-right direction.

For instance, the longitudinal members 51 may be provided by circular steel tubes disposed along the front-rear direction and each being gently bent into a crank-like shape in side view at its middle portion in the front-rear direction, so that a rear portion of each longitudinal member 51 is located slightly above a front portion thereof. In the front portion of the longitudinal member 51, a middle portion in the front-rear direction is gently bent so that a front half of the front portion is slightly inclined upward. Hereinafter, the front half of the front portion of the longitudinal member 51 will be referred to as "front inclined portion 57". On the other hand, a rear end portion of the longitudinal member 51 is bent upward. The longitudinal members 51 may be provided by rectangular steel tubes.

A plurality of the longitudinal members 51 are arranged in the left-right direction to entirely overlap one another in side view. Front ends of the longitudinal members 51 are abutted and joined, from the rear lower side, to a front transverse member 52*a* extending along the left-right direction, which may be a rectangular steel tube. Rear ends of the longitudinal members 51 are abutted and joined, from the lower side, to a rear transverse member 52*b* extending along the left-right direction, which may be a circular steel tube. The frame 53 mainly composed of the longitudinal members 51 and the transverse members 52*a*, 52*b* is substantially foursquare in top view. The transverse dimension of the frame 53 is made substantially the same as that of the frame 22 of the first beach cleaner 20.

Between one in the middle of the left-right direction arrangement of the longitudinal members 51 and each of a leftmost and a rightmost one of the longitudinal members 51, there are arranged a plurality (e.g., three) of scraper frames 58 in the left-right direction. The scraper frames 58 are inclined to overlap the front inclined portions 57 in side view. The scraper frames 58 are formed of circular steel tubes of the same diameter as the longitudinal members 51, but may be formed of rectangular steel tubes instead. Front ends of the scraper frames 58 are abutted and joined, from the rear side, to the front transverse member 52*a*, and rear ends of the scraper frames 58 are free ends not jointed to any members. The scraper frames 58 and the longitudinal member 51 at the middle in the left-right direction are arranged at almost regular intervals, but a leftmost and a right most one of the scraper frames 58 are respectively spaced from the leftmost and the rightmost longitudinal members 51 by an interval narrower than the intervals at the other positions.

To the front inclined portions 57 of the longitudinal members 51 and the scraper frames 58 are attached keel members 54 and a scraper 55 that cooperate to function as a churn-up portion which churns up sand and relatively small-sized litter (e.g., beverage containers, waste paper, and cigarette butts) while the second beach cleaner 50 is traveling by being towed.

Figure 19:
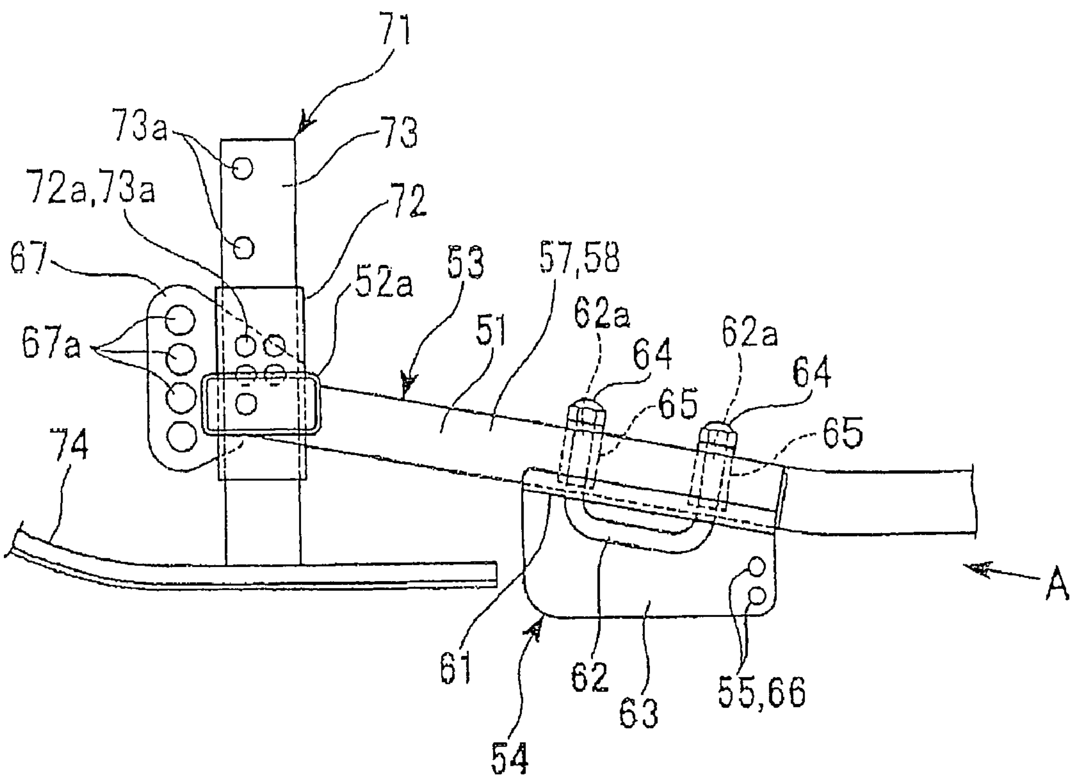
FIG. 19 is a side view of a front portion of a frame of the second beach cleaner.
Figure 20:
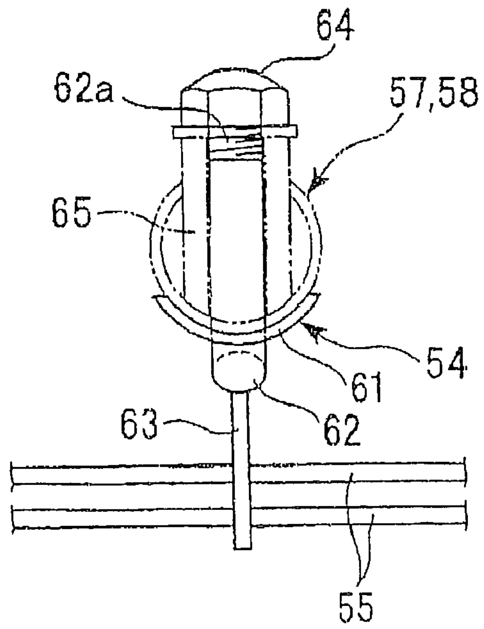
FIG. 20 is a view as seen in the direction of arrow A in FIG. 19.

Referring further to FIGS. 19 and 20, the keel members 54 are detachably attached to rear portions of the front inclined portions 57 of the longitudinal members 51, and rear portions of the scraper frames 58. Each of the keel members 54 includes a plate-like member 61 curved to fit a lower outer surface of the front inclined portion 57 or of the scraper frame 58, a U-shaped pin 62 open upward in side view and having two arms that extend through the plate-like member 61, and a keel main body 63 formed of a plate-like member extending downward from a lower end of the plate-like member 61 to substantially perpendicularly intersect the left-right direction.

An upper portion of each of the two arms of the U-shaped pin 62 is formed as an externally threaded portion 62*a*. With the two externally threaded portions 62*a* extending from the under side of the front inclined portion 57 or the scraper frame 58 therethrough to protrude to the upper side thereof, the plate-like member 61 contacts an under surface of the front inclined portion 57 or of the scraper frame 58, and cap nuts 64 are threadably mounted on the respective externally threaded portions 62*a* and tightened, thereby fixing the keel member 54 to the front inclined portion 57 or the scraper frame 58. At positions where the two arms of the U-shaped pin 62 extend through the front inclined portion 57 or scraper frame 58, there are inserted and fixed cylindrical collars 65.

At a rear end portion of each keel member 54 (or of each keel main body 63), a plurality of scraper support holes 66 are formed, and the scraper 55 is inserted and supported to each of the scraper support holes 66. For instance, the scraper 55 is a bar-like member extending along the left-right direction and circular in cross section, and extends across the keel members 54 by being inserted through and supported by one of the scraper support holes 66 arranged in the vertical direction. The scraper 55 is selectively supportable depending on the conditions of the sandy beach and litter, and a plurality of scrapers 55 are supportable. At each of two opposite ends of the scraper 55, there is provided a stopper for preventing falling off of the scraper 55 from the keel members 54. For instance, the stopper may be a predetermined engaging pin inserted. The cross-sectional shape of the scraper 55 may not be limited to a circular shape but may be otherwise. For instance, the scraper 55 may have an upper surface inclined downward toward the front side to be semi-circular in cross section. A single scraper 55 may be used, or alternatively three or more scrapers 55 may be used, and the scrapers 55 may not be arranged in the vertical direction but in the left-right direction or obliquely.

The keel members 54 and the scraper 55 are disposed to sink into the sand by a suitable amount. With the keel members 54 and the scraper 55 in such a sunk condition, the second beach cleaner 50 travels so that the keel members 54 push through the sand and litter, and the scraper 55 churns up the sand and litter. The churned up sand and litter are deposited in the mesh member 56 in the rear portion of the frame 53.

Figure 26:
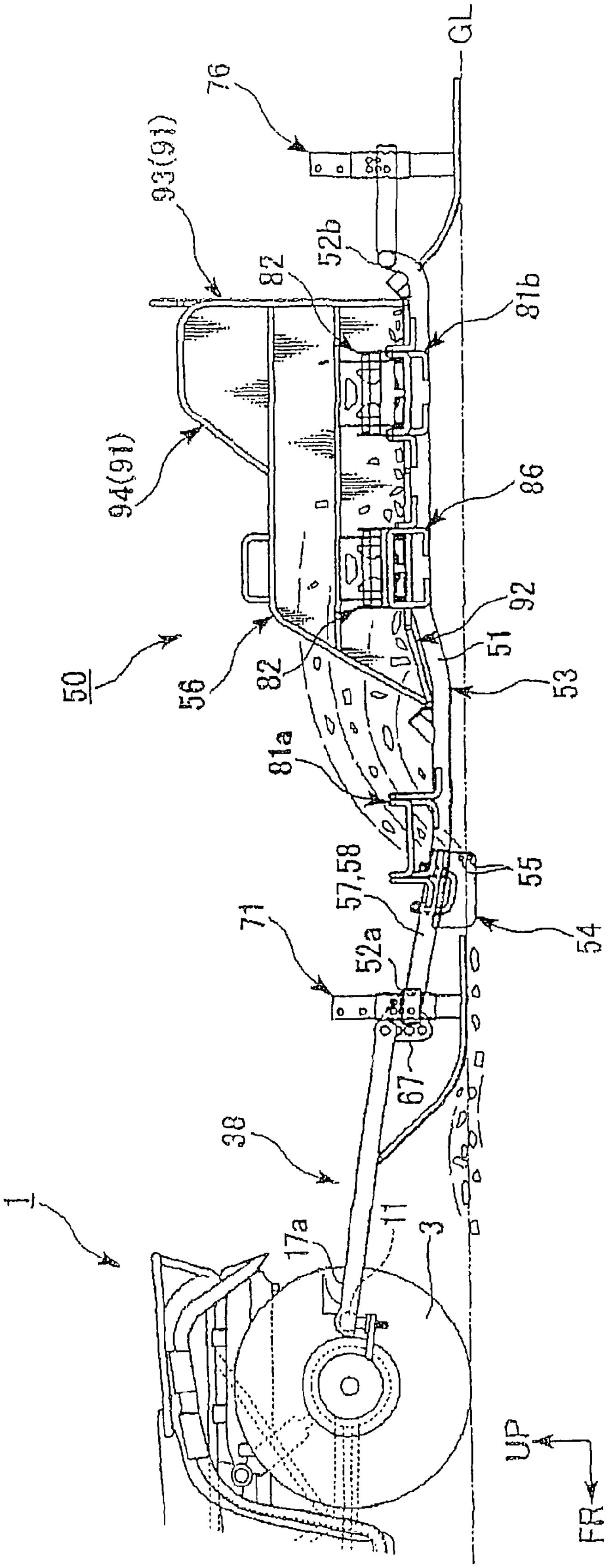
FIG. 26 is a side view of the second beach cleaner as towed by the vehicle.

Referring to FIGS. 16 and 17, a tow portion 67 for use in towing the second beach cleaner 50 by the vehicle 1 is disposed on the front side of each of the second leftmost one and the second rightmost one of the scraper frames 58 as counted from left and right of the frame 53, respectively, for instance. The tow portion 67 is formed of a thick plate-like member extending to perpendicularly intersect the left-right direction, and has a plurality (e.g., four) of connecting holes 67*a* arranged in the vertical direction. The second end of the tow rod 38 the other end of which is connected to the trailer hitch 11 is engaged with one of the connecting holes 67*a*, so that the second beach cleaner 50 is towed by the vehicle 1 through the tow rod 38 (see FIG. 26).

By the selection of the one connecting hole 67*a* with which the second end of the tow rod 38 is engaged, the tow position can be set at the most suitable one that corresponds to the road clearance of the second beach cleaner 50 and other conditions. The transverse distance between the left and right tow portions 67 is almost the same as that of the left and right tow portions 37.

For instance, on the front side of each of the leftmost and rightmost scraper frames 58 of the frame 53, a front ski support pipe 72 for supporting a front ski leg 71 is disposed. The front ski support pipe 72 is provided by a member, which may be a rectangular steel tube, for instance, and vertically extends through the front transverse member 52*a*. The front ski support pipe 72 can support a leg member 73 of the front ski leg 71 as inserted in the front ski support pipe 72. The leg member 73 is provided by a rectangular steel tube. The front ski leg 71 functions to set the road clearance (the height from the upper surface of the sand ground) of a front portion of the second beach cleaner 50 at a predetermined value, and enhance the slidability of the second beach cleaner 50 on the sand ground. The front ski leg 71 is constructed such that the leg member 73 stands on a front ski plate 74 having a predetermined width and a upward curved front portion.

The front ski support pipe 72 has a transverse through-hole 72*a*, and the leg member 73 has a plurality (e.g., four) of transverse through-holes 73*a* vertically arranged to correspond to the transverse through-hole 72*a*. By aligning one of the transverse through-holes 73*a* with the transverse through-hole 72*a* of the ski support pipe and inserting a predetermined engaging pin or others through the aligned holes 73*a*, 72*a*, the height of the front portion of the frame 53 relative to the front ski leg 71 is determined, thereby setting the road clearance of the front portion of the second beach cleaner 50 at the predetermined value. That is, by selecting the one of the transverse through-holes 73*a* of the leg member 73 into which the engaging pin or others is inserted, the road clearance of the front portion of the second beach cleaner 50 is adjustable, thereby enabling adjustment of the amount of sinking of the keel members 54 and the scraper 55 into the sand.

From a rear side of the rear transverse member 52*b* and at each of two lateral sides, an extension frame 75, which may be provided by a rectangular steel tube, extends rearward. At rear end portion of the extension frame 75, a rear ski support pipe 77 for supporting a rear ski leg 76 is disposed. The rear ski support pipe 77 vertically extends through the extension frame 75 and may be provided by a rectangular steel tube, for instance. The rear ski support pipe 77 can support a leg member 78 of the rear ski leg 76 as inserted in the rear ski support pipe 77. The leg member 78 may be provided by a rectangular steel tube. The rear ski leg 76 has the same structure and function as those of the front ski leg 71, and is constructed such that the leg member 78 stands on a rear ski plate 79.

The rear ski support pipe 77 has a single transverse through-hole 77*a*, and a plurality (e.g., four) of transverse through-holes 78*a* vertically arranged are formed in the leg member 78 to correspond to the transverse through-hole 77*a*.

By aligning one of the transverse through-holes 78*a* with the transverse through-hole 77*a* of the ski support pipe and inserting a predetermined engaging pin or others through the aligned holes 78*a*, 77*a*, the height of the rear portion of the frame 53 relative to the rear ski leg 76 is determined, thereby setting the road clearance of the rear portion of the second beach cleaner 50 at the predetermined value (that is, the rear portion of the second beach cleaner 50 is adjustable). The transverse dimension between the outer ends of the front ski plates 74 of the left and right front ski legs 71 is substantially the same as the transverse dimension of the frame 53, and the transverse dimension between the outer ends of the rear ski plates 79 of the left and right rear ski legs 76 is narrower than the transverse dimension of the frame 53.

At the front and rear portions of the frame 53 and on the left and right outer sides thereof, there are disposed front and rear lift arms 81*a*, 81*b* each of which extends from the outer end leftward and rightward. Each lift arm 81*a*, 81*b* is a frame-like member having a rectangular shape long in the transverse direction in top view, for instance. A middle portion of each of the lift arm 81*a*, 81 *b* in the left-right direction is substantially horizontal, with an inner portion and an outer portion thereof in the left-right direction being respectively bent obliquely downward toward the inside and the outside. The dimension between outer lateral ends of the left and right lift arms 81*a*, 81 *b* is larger than the dimension of the left and right side structures 41 of the litter collecting station 40 in the same direction (in other words, substantially the same as the transverse dimension between the outer lateral ends of the left and right lift arms 39 of the first beach cleaner 20). When the second beach cleaner 50 enters a space between the left and right side structures 41, the left and right lift arms 81*a*, 81*b* get upon the left and right side structures 41 to lift the second beach cleaner 50 by a predetermined amount.

Figure 18:
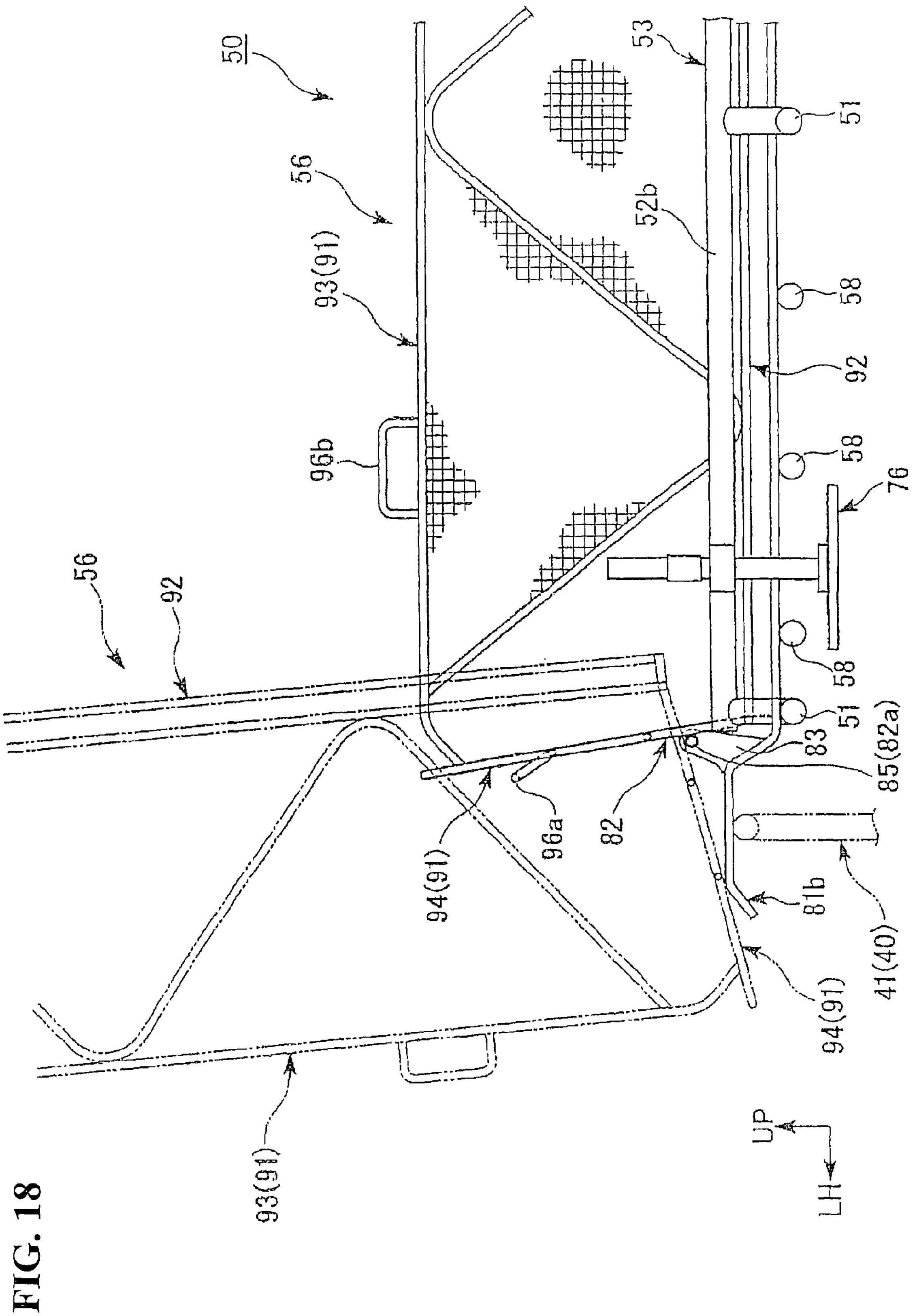
FIG. 18 is a rear view corresponding to FIG. 16.

When the second beach cleaner 50 is lifted at the litter collecting station 40 as described above, the mesh member 56 at the rear portion of the frame 53 lifts to a predetermined level, and it becomes easy to collect the litter deposited in the mesh member 56 by pivoting the mesh member 56 around a hinge 82 disposed at the left side of the mesh member 56 (see FIG. 18). However, the collection of litter is possible even while the second beach cleaner 50 is in contact with the ground and not lifted.

Figure 21:
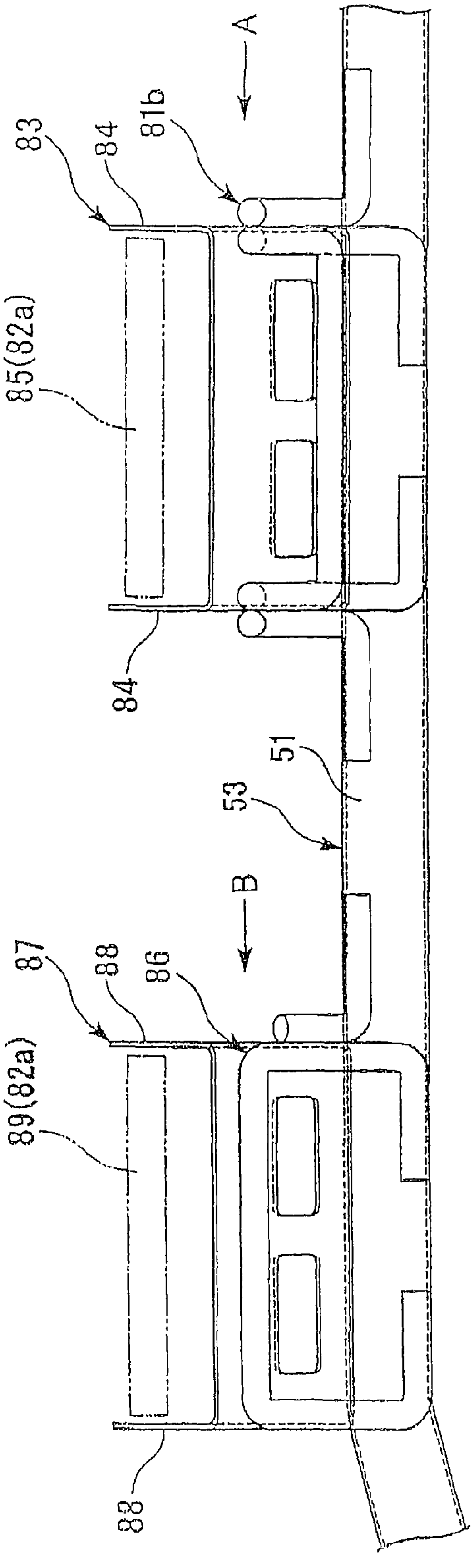
FIG. 21 is a side view of a hinge for a mesh member of the second beach cleaner and its vicinity.
Figure 22A:
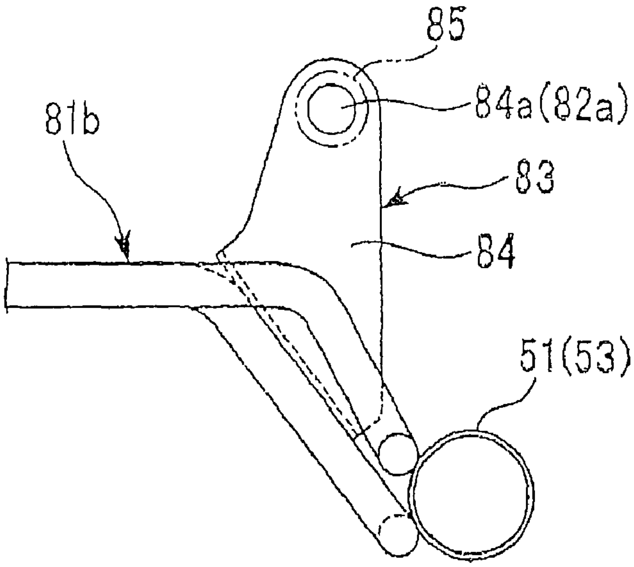
FIGS. 22(*a*) and 22(*b*) are views as seen in the direction of arrow A and arrow B in FIG. 21, respectively.
Figure 22B:
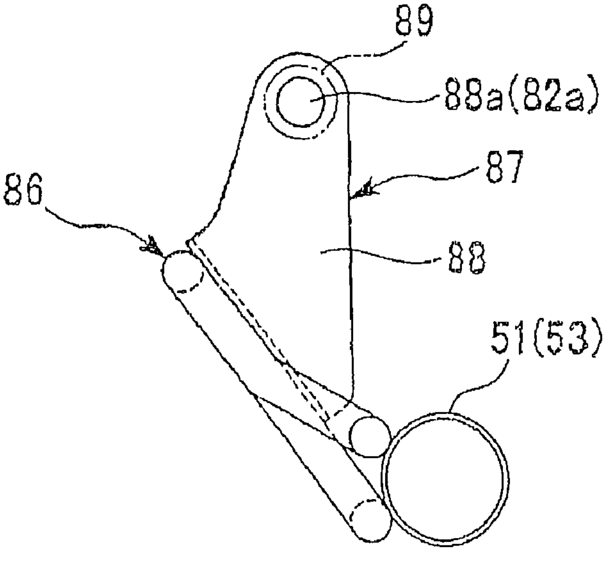

Referring further to FIGS. 21, 22, on the rear lift arm 81*b* at the left side of the frame 53, there is disposed a rear hinge bracket 83 constituting a part of the hinge 82 pivotally supporting a left-side portion of the mesh member 56. The rear hinge bracket 83 extends in the front-rear direction along the proximal side of the rear lift arm 81*b*, and has, at its front and rear ends, front and rear walls 84 standing upward. At an end portion of each of the front and rear walls 84, there is formed a longitudinal through-hole 84*a* for a hinge shaft 82*a*. Between the front and rear walls 84, a rear hinge pipe 85 disposed at the left side of the mesh member 56 to correspond to the rear hinge bracket 83, so that the rear hinge pipe 85 is pivotally supported by the rear hinge bracket 83 via the hinge shaft 82*a* extending in the left-rear direction.

On the slightly front side of the rear lift arm 81*b*, a support arm 86 as a frame-like member having a transverse dimension smaller than that of the lift arm 81*b*. The support arm 86 supports a front hinge bracket 87 constructed similarly to the rear hinge bracket 83. In each of front and rear walls 88 of the front hinge bracket 87, a longitudinal through-hole 88*a* for a hinge shaft 82*a* is formed. Between the front and rear walls 88, a front hinge pipe 89 is disposed at the left side of the mesh member 56 to correspond to the front hinge bracket 87. The front hinge pipe 89 is pivotally supported by the front hinge bracket 87 via the hinge shaft 82*a* extending in the front-rear direction. The hinge pipes 85, 89 and hinge shafts 82*a* are coaxial with one another.

As shown in FIGS. 16 and 17, the mesh member 56 has a box-like shape open at the front and upper sides. For instance, the mesh member 56 is constructed such that a metallic mesh with a predetermined mesh size is attached to a frame mainly composed of steel tubes. The mesh member 56 is disposed from a position slightly forward side of the longitudinal center of the frame 53 to a position near a rear end of the frame 53, and the transverse dimension of the mesh member 56 is substantially the same as that of the frame 53. The position of the front end of the mesh member 56 is spaced toward the rear side from the proximity of the rear end portions of the keel members 54, i.e., the proximity of the scraper 55, by about 100-300 mm, so as to well catch the sand and litter churned up by the keel members 54 and the scraper 55. More preferably, the position of the front end of the mesh member 56 is spaced toward the rear side from the proximity of the rear ends of the keel members 54 by about 250 mm.

Referring further to FIG. 18, the mesh member 56 has a bottom wall 92 having a rectangular shape long in the transverse direction in top view, a rear wall 93 standing substantially upright from a rear end of the bottom wall 92, and left and right side walls 94 each standing slightly obliquely from opposite lateral ends of the bottom wall 92 to incline outward, i.e., to the left and right, toward the upper side. To enable to deposit the litter churned up by the keel members 54 and the scraper 55 on the bottom wall 92, the rear wall 93 and the left and right side walls 94 cooperate to form an encircling member 91 that encircles the circumference of the bottom wall 92 except a part at the front side so that the encircling member 91 is open at the front side.

A front portion of the bottom wall 92 is slightly inclined frontward to form an inclined portion 92*a*. The other part of the bottom wall 92 on the rear side of the inclined portion 92*a* forms a horizontal portion that extends substantially horizontally. The horizontal portion is sectioned into a front horizontal portion 92*b* and a rear horizontal portion 92*c*, by a border in the form of a transverse member extending in the left-right direction.

A metallic mesh with a mesh size of 25 mm is attached to the inclined portion 92*a* of the bottom wall 92, a metallic mesh of a mesh size of 12 mm is attached to the front horizontal portion 92*b*, and a metallic mesh with a mesh size of 8 mm is attached to the rear horizontal portion 92*c*.

By setting the mesh sizes of the metallic meshes constituting the bottom wall 92 to become rougher from rear to front, a part of the sand and others churned up by the keel members 54 and scraper 55, which are relatively heavy due to a large amount of moisture retained thereby, does not reach the rear side of the bottom wall 92, but is well sieved off to fall to the ground through the roughest mesh at the inclined portion 92*a* at the front side of the bottom wall 92, without causing clogging or other problems. On the other hand, the remaining part of the churned up sand and others which are relatively light due to their high dryness reach the horizontal portion at the rear side of the bottom wall 92 along with the litter, and are sieved off to fall to the ground through the second roughest and finest meshes attached there while the litter does not fall through the meshes but is excellently caught thereat. The meshes are suitably replaceable among those with mesh sizes of 8, 10, 12 and 25 mm, or within a range like this.

Each of the side walls 94 of the mesh member 56 has a side-wall main body 94*a* having a rectangular shape long in the front-rear direction in side view and disposed on the upper side of one of the lateral ends of the bottom wall 92, and a rear protruding portion 94*b* having a trapezoidal shape in side view and disposed on the upper side of a rear portion of the side-wall main body 94*a*. Rear ends of the side-wall main body 94*a* and the rear protruding portion 94*b* are aligned into a straight line extending substantially upright in side view. The rear wall 93 of the mesh member 56 is disposed such that two lateral ends of the rear wall 93 agree with these rear ends. An upper end of each side wall 94 and that of the rear wall 93 are located substantially at the same height level.

Front and rear hinge plates 95*a*, 95*b* are disposed on the left side wall 94 at a front position and a rear position therein respectively, such that the front and rear hinge plates 95*a*, 95*b* extend across a middle frame member and a lower frame member of the side-wall main body 94*a* of the left side wall 94. The hinge plates 95*a*, 95*b* are plate-like members each of which is substantially foursquare in side view and a part of which is suitably cut out to leave an outer rim and a part along diagonal lines. Front and rear end portions of the hinge plates 95*a*, 95*b* are bent inward in the left-right direction to form a reinforcing flange. On outer side surfaces of the hinge plates 95*a*, 95*b*, there are integrally connected the front and rear hinge pipes 89, 85, respectively.

On the upper side of a front portion of each of the left and right side walls 94 (and above the front hinge plate 95*a* with respect to the left side wall 94), a handle 96*a* is disposed to protrude upward from the upper end of the side wall 94. The handle 96*a* is U-shaped open downward in side view, and disposed such that an upper straight segment thereof extends along the front-rear direction. The handle 96*a* is inclined to be located on the outer side of the corresponding side wall 94 by a slight amount. Two handles 96*b* are disposed at the upper side of the rear wall 93 such that the handles 96*b* protrude upward from an upper end of the rear wall 93 at a left-side and a right-side position, respectively. Each of the handles 96*b* is U-shaped open downward in rear view, and disposed substantially upright such that an upper segment thereof extends in the left-right direction and substantially in the same plane as the rear wall 93.

The left-side portion of the mesh member 56 is pivotably connected to the left side of the frame 53 via the hinge 82 to be supported thereby, as described above. When the mesh member 56 is brought into an upright position where the bottom wall 92 thereof is substantially upright, by moving a right side portion of the mesh member 56 upward to pivot the mesh member 56 via the hinge 82, the litter deposited in the mesh member 56 falls onto the left side wall 94 so that the litter is moved along the left side wall 94 to be discharged out of the mesh member 56.

Since the handles 96*a*, 96*b* are disposed at the respective positions (that should include at least the position opposite to the hinge 82) on the encircling member 91 of the mesh member 56, collection of litter by pivoting the mesh member 56 is made easy. By disposing the hinge 82 at one of the shorter sides (the left side) of the transversely elongate mesh member 56, the dimension from the pivot axis around which the mesh member 56 is pivoted to stand upright, to the operated portion (handle at the right side) is made relatively large, so as to facilitate the operation to pivot the mesh member 56.

The left side wall 94 of the mesh member 56 (in other words, the wall on the side of the hinge 82 of the encircling member 91) is provided with a board to obtain a good result of the discharge of litter. The upper end of the left side wall 94 of the mesh member 56 projects leftward from the outer side of the litter collecting station 40 when the mesh member 56 is made to stand upright (see FIG. 18). Hence, where a litter collecting container is placed adjacent to the left side of the litter collecting station 40, the left side wall 94 is inclined to be a slope enabling direct input of the deposited litter from the mesh member 56 into the container. The right side wall 94 and the rear wall 93 of the mesh member 56 are constructed to prevent falling off of the litter input into the mesh member 56, and may be formed as a mesh portion where a metallic mesh with a relatively large mesh size is attached, for instance.

On the leftmost and rightmost longitudinal members 51 of the frame 53, there are disposed left and right front-end stoppers 97*a* and left and right rear-end stoppers 97*b* that determine the positions of left and right front ends and left and right rear ends of the mesh member 56. Each stopper 97*a*, 97*b* has a position regulating surface that is substantially vertical and a pivoting guide surface. The position regulating surface is to contact the front or rear end of the mesh member 56, and the pivoting guide surface extends continuously from and above the position regulating surface and is inclined with respect thereto. For instance, the stoppers 97*a*, 97*b* are detachably attached to the longitudinal member 51 using a bolt or others.

The position regulating surfaces of the left and right front-end stoppers 97*a* are contacted by the left and right front ends of the mesh member 56 in use (i.e., in the state where the bottom wall 92 is held substantially horizontal and in contact with the frame 53), and the position regulating surfaces of the left and right rear-end stoppers 97*b* are contacted by the left and right rear ends of the mesh member 56 in use, whereby the mesh member 56 is positioned relative to the frame in the front-rear direction. When the mesh member 56 is pivoted to return its position from the upright position to the position for use, the left and right front ends and the left and right rear ends thereof are guided by the guide surfaces of the stoppers 97*a*, 97*b*, thereby smoothly returning the mesh member 56 to its predetermined position on the frame 53.

Figure 23A:
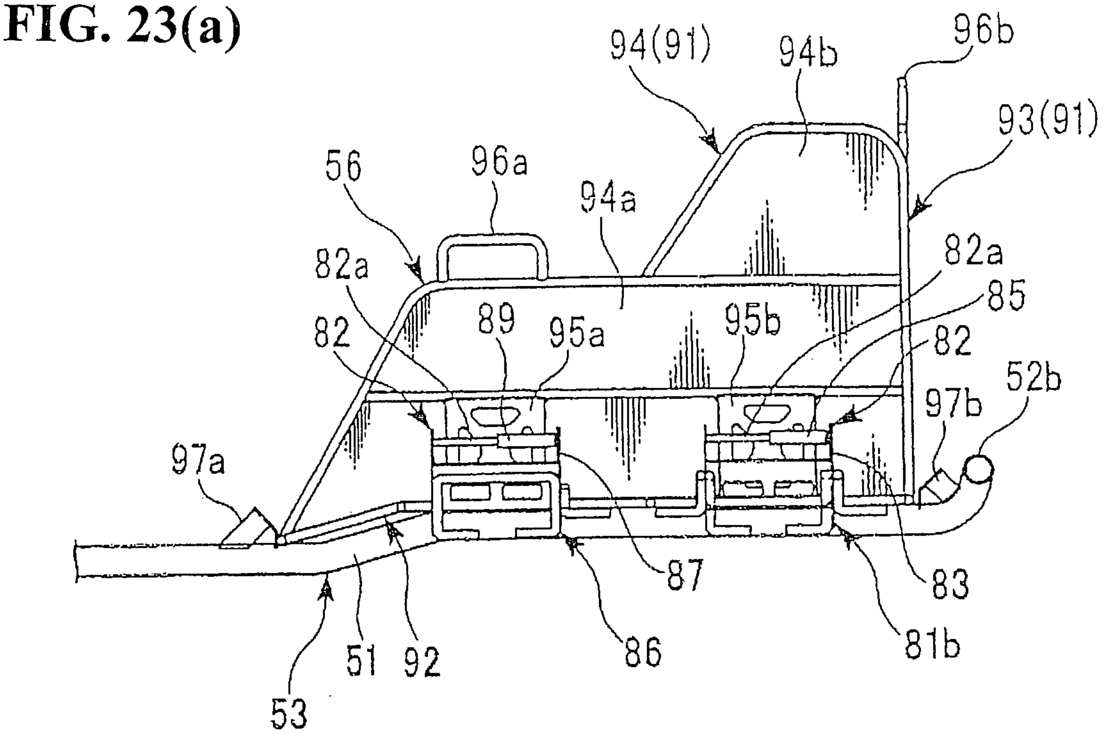
FIGS. 23(*a*) and 23(*b*) represent a case where the mesh member of the second beach cleaner is made movable in a front-rear direction, and are side views of the mesh member at a retracted position and at an advanced position, respectively.
Figure 23B:
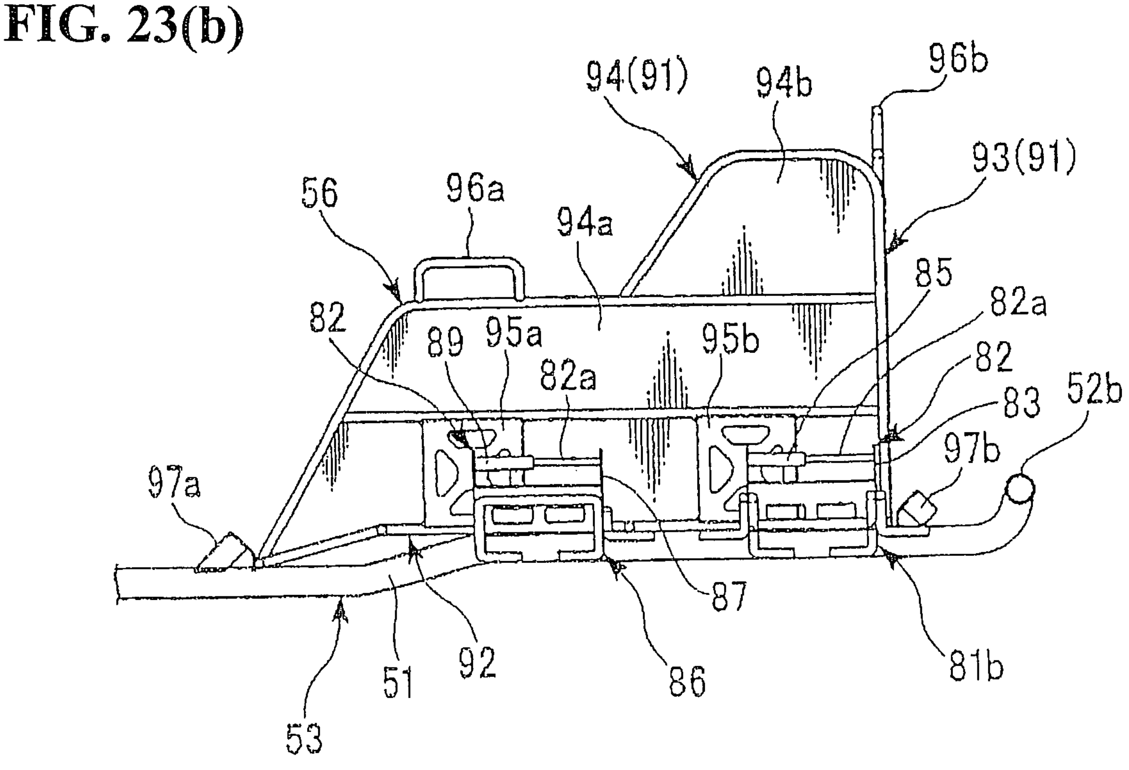

As shown in FIG. 23, the positions on the longitudinal members 51 where the stoppers 97*a*, 97*b* are attached may be shiftable in the front-rear direction. In a case where such a structure is employed, the mesh member 56 also becomes shiftable in the front-rear direction according to the shift of the stoppers 97*a*, 97*b*, by means of setting the lengths of the front and rear hinge pipes 85, 89 at the left side of the mesh member 56 smaller than the distances between the front and rear walls 84, 88 of the front and rear hinge brackets 83, 87, respectively, or by other means. The thus making the front end position of the mesh member 56 easily changeable depending on the state of the sand ground enhances the capability of the second beach cleaner 50 to capture litter.

There will be roughly described a procedure of cleaning a sandy beach using the beach cleaners 20, 50.

First, the litter collecting station 40 is carried by being mounted in the trailer 13 as shown in FIG. 1 and installed at a predetermined position on the sandy beach. Although FIG. 1 shows an example where the litter collecting station 40 as assembled is mountable on the trailer 13, the litter collecting station 40 may be mounted on the trailer 13 in the above-described disassembled state where the side structures 41 and the connecting members 42 are disconnected from each other. In this case, installation of the litter collecting station 40 including loading and unloading thereof onto and from the trailer 13 is easier. It is noted that in FIG. 1 only the foot members 45 are removed from the litter collecting station 40.

Next, the firmness of the ground of the sandy beach is measured to be used as a criterion for determination of the number of the sand pins 23 of the first beach cleaner 20 and the amount of sinking of the keel members 54 and scraper 55 of the second beach cleaner 50 into sand ground. For instance, this measurement may be conducted such that a steel picket of a predetermined size is made to free-fall from a predetermined height level onto the sand ground for a plurality of times, and the firmness of the sand ground is evaluated into three ranks (soft, medium, and firm) based on an average value of the results obtained by the free-fallings. Depending on the measured firmness of the sand ground and the scattering state of the litter and other conditions, the number of the sand pins 23, the weight of the weight 34, the level at which the ski legs are attached, the connecting position of the tow rod 38 relative to the tow portions 37, 67, and others are determined.

Figure 24:
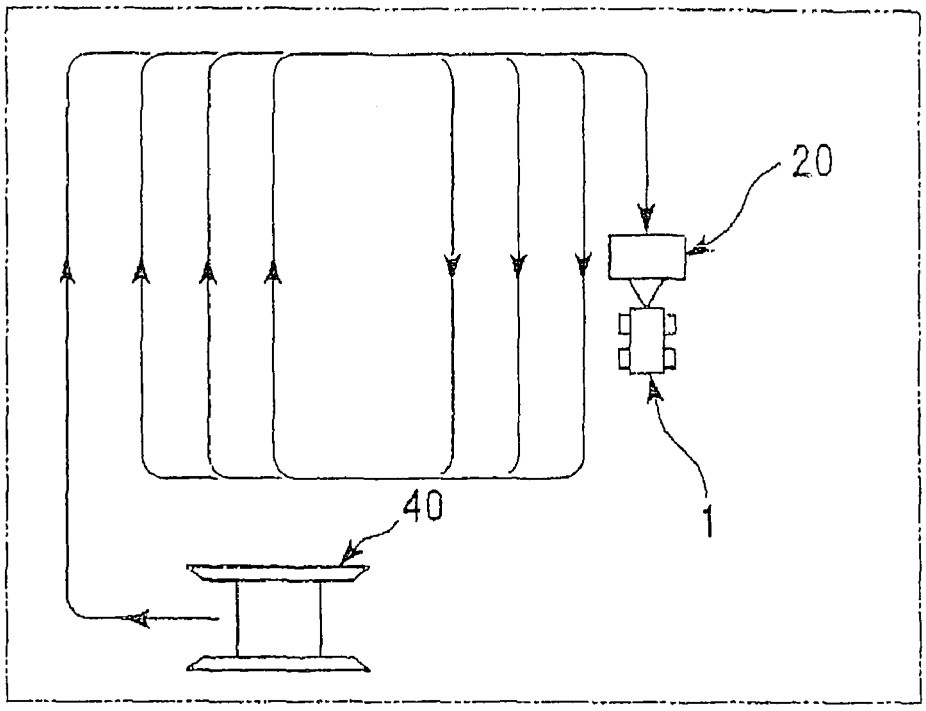
FIG. 24 illustrates a path along which the vehicle travels when a sandy beach is cleaned using the beach cleaners of the embodiment.

Then, the first beach cleaner 20 is taken down from the trailer 13, and various settings are made based on the result of the measurement of the firmness of the sand ground. Thereafter, the first beach cleaner 20 is towered by the vehicle 1 to travel on the sand ground at a constant speed. As shown in FIG. 24, the vehicle 1 and first beach cleaner 20 is moved to travel along a circling path drawn within a predetermined range on the sand ground and substantially formed of a plurality of squares whose positions are gradually shifted, so as to evenly clean the predetermined range with assuredness. Since the first beach cleaner 20 picks up litter of relatively large size on the sandy ground by having the sand pins 23 biting into the sand ground, the travel resistance thereof is relatively high. Hence, the travel speed thereof is set at a value as low as about 5-10 km/h.

When litter is deposited under the frame 22 of the first beach cleaner 20 in a predetermined amount as a result of traveling of the first beach cleaner 20 over the sandy beach in the way as described above, the first beach cleaner 20 is returned to the litter collecting station 40 so that collection of the deposited litter is performed. The deposited litter is collected such that when the first beach cleaner 20 enters the space between the left and right side structures 41 after the vehicle 1 has passed through the left and right side structures 41 of the litter collecting station 40, the left and right lift arms 39 thereof get upon the left and right side structures 41 to lift the first beach cleaner 20 by the predetermined amount (see FIG. 13). In this state, the vehicle 1 and first beach cleaner 20 are stopped, and then the litter having been let to fall onto the sand ground is collected. Then, the vehicle 1 and first beach cleaner 20 are again made to travel to repeat the above-described litter collection.

When the cleaning using the first beach cleaner 20 over the predetermined range is done, the second beach cleaner 50 is made to travel over the same range by towing thereof to pick up litter of relatively small size on the sandy beach. By using the second beach cleaner 50 after use of the first beach cleaner 20, damage of the keel members 54, scraper 55, mesh member 56, and others that deal with small-sized litter is reduced. The path along which the second beach cleaner 50 travels is the same as that of the first beach cleaner 20. When the second beach cleaner 20 travels, the sand ground has been turned up by the operation of the first beach cleaner 20 and soft, and the keel members 54 and the scraper 55 should churn up sand and litter. Hence, the travel speed of the second beach cleaner 20 is set at a value slighter higher than that of the first beach cleaner 20, i.e., about 15-25 km/h.

By the second beach cleaner 50 traveling over the sandy beach, litter of relatively small size is churned up along with sand by the keel members 54 and the scraper 55, and the churned up litter and sand are deposited in the mesh member 56 at the rear portion of the frame 53. Since it is set such that the mesh size of the meshes at the bottom wall 92 of the mesh member 56 decreases from front to rear, the deposited litter does not easily fall and clogging of the meshes is inhibited.

When the predetermined amount of litter has been deposited in the mesh member 56 as a result of the traveling of the second beach cleaner 50 over the sandy beach in the way as described above, the second beach cleaner 50 returns to the litter collecting station 40 and collection of the deposited litter is performed. The deposited litter is collected such that when the second beach cleaner 50 enters the space between the left and right side structures 41 of the litter collecting station 40 after the vehicle 1 has passed through the left and right side structures 41, the left and right lift arms 81*a*, 81*b* at the front and rear sides thereof get upon the left and right side structures 41 to lift the second beach cleaner 50 by the predetermined amount. In this state, the vehicle 1 and second beach cleaner 50 are stopped, and the mesh member 56 is pivoted and the deposited litter is collected. Thereafter, the vehicle 1 and the second beach cleaner 50 are again made to travel to repeat the collection of litter as described above.

As has been illustrated above, the second beach cleaner 50 according to the embodiment includes: the frame 53 including the plurality of longitudinal members 51 each extending along the traveling direction and the plurality of transverse members 52*a* and 52*b* each extending in the transverse direction such that the transverse members 52*a*, 52*b* extend substantially perpendicularly to the longitudinal members 51; the keel members 54 and the scraper 55 disposed in the front portion of the frame 53; the mesh member 56 disposed in the rear portion of the frame 53; and the tow portion 67 disposed at the front end portion of the frame 53, the churn-up portion churning up litter scattered on the sand ground, along with sand, while the second beach cleaner 50 is traveling on the surface of the sand ground by being towed by the towing vehicle 1, and the churned up litter being deposited in the mesh member 56, wherein the mesh member 56 has the encircling member 91 open at least at a side, and the mesh of the mesh member 56 is relatively rough at the front portion thereof in the traveling direction and finer at the rear portion thereof in the traveling direction than that of at least the front portion.

According to this arrangement, relatively heavy damp sand is well sieved off to fall through the relatively rough mesh at the front portion of the mesh member 56 in the traveling direction. On the other hand, relatively light dry sand reaches the rear portion of the mesh member 56 in the traveling direction along with litter of relatively small size, and sieved off to fall through the relatively fine mesh while the litter does not tend to fall therethrough but is caught excellently. That is, irrespective of the conditions of the sand and litter, the sand reaching the mesh member 56 is allowed to easily fall while the litter is inhibited from falling, thereby enhancing the capability of the second beach cleaner 50 to collect litter.

In the second beach cleaner 50, the mesh member 56 is disposed to be shiftable in position in the front-rear direction and relative to the frame 53. Thus, the position of the mesh member 56 is shiftable in the front-rear direction depending on the state of scraping up of sand and litter, thereby allowing the sand to fall further easily and inhibiting the litter from falling more strictly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A beach cleaner comprising:

a frame including a plurality of longitudinal members each extending along a traveling direction of the beach cleaner, and a plurality of transverse members each extending in a transverse direction of the beach cleaner, the transverse members extending substantially perpendicularly to the longitudinal members;

a churn-up portion disposed in a front portion of the frame;

a mesh member disposed in a rear portion of the frame; and a tow portion disposed at a front end portion of the frame, the churn-up portion adapted to churn up litter scattered on sand ground, along with sand, while the beach cleaner is traveling on a surface of the sand ground by being towed by a towing vehicle, and the churned up litter being deposited in the mesh member, wherein the mesh member has an encircling member open at least at a side, the mesh member including mesh that is relatively rough at a front portion thereof in the traveling direction, and that is finer at a rear portion thereof in the traveling direction than that of at least the front portion, and further comprising:

a pair of extension frames extending rearwardly from a rearmost transverse member, each of the extension frames having a rear end portion upon which a rear ski support pipe for supporting a rear ski leg is disposed, wherein each of the rear ski legs is adjustable with respect to the corresponding extension frame in a direction that is orthogonal to a length of the rearwardly extending extension frame.

2. The beach cleaner according to claim 1, further comprising a pair of front ski support pipes disposed on a front portion of the frame, wherein each of the front ski support pipes is disposed further away from a center line of the frame than each of the rear ski support pipes, and wherein the front ski support pipes and the rear ski support pipes having lengths which are parallel to each other.

3. The beach cleaner according to claim 1, further comprising a front end stopper and a rear end stopper for determining positions of a front end and a rear end of the mesh member.

4. The beach cleaner according to claim 2, further comprising a front end stopper and a rear end stopper adapted to be shiftable in a front-rear direction along lengths of the longitudinal members for determining positions of a front end and a rear end of the mesh member.

5. The beach cleaner according to claim 1, wherein a front portion of the mesh member is slightly inclined forwardly.

6. The beach cleaner according to claim 1, wherein the encircling member includes a pair of side walls and a rear wall, wherein each of the side walls extends along an entire length of the mesh member in the traveling direction.

7. The beach cleaner according to claim 1, wherein the mesh member is rotatable about a hinge pipe in a direction orthogonal to the traveling direction.

8. The beach cleaner according to claim 1, further comprising lift arms extending laterally outward from left and right ones of the plurality of longitudinal members; and a hinge pipe mounted on a U-shaped hinge bracket fixed on one of the lift arms, about which the mesh member is rotatable, and when the mesh member is rotated to a upright position for emptying the mesh member a side wall of the mesh member rests against at least one of the lift arms.

9. The beach cleaner according to claim 1, further comprising a hinge on one of a left or a right side of the mesh member, and a handle on the other of the left and right side of the mesh member.

10. The beach cleaner according to claim 1, wherein the mesh member includes a hinge pipe that is shiftable in a front-rear direction between front and rear walls of a hinge bracket mounted on one of the longitudinal members.

11. A beach cleaner comprising:

a frame including a plurality of longitudinal members each extending along a traveling direction of the beach cleaner, and a plurality of transverse members each extending in a transverse direction of the beach cleaner, the transverse members extending substantially perpendicularly to the longitudinal members;

a churn-up portion disposed in a front portion of the frame;

a mesh member disposed in a rear portion of the frame; and a tow portion disposed at a front end portion of the frame, the churn-up portion adapted to churn up litter scattered on sand ground, along with sand, while the beach cleaner is traveling on a surface of the sand ground by being towed by a towing vehicle, and the churned up litter being deposited in the mesh member, wherein the mesh member has an encircling member open at least at a side, wherein mesh of the mesh member is relatively finer at rear portion of the mesh member in the traveling direction than is the mesh in a front portion of the mesh member, wherein the churn-up portion includes a bar-shaped scraper extending through a plurality of keel members positioned from left to right near a front of the beach cleaner, wherein the churn-up portion includes a plurality of scraper frames, the scraper frames and the longitudinal member at a middle of the frame in a left-right direction are arranged at almost regular intervals, whereas a left most and a right most one of the scraper frames are respectively spaced from left most and right most longitudinal members by an interval narrower than the almost regular intervals, and further comprising a pair of extension frames extending rearwardly from a rearmost transverse member, each of the extension frames having a rear end portion upon which a rear ski support pipe for supporting a rear ski leg is disposed, wherein each of the rear ski legs is adjustable with respect to the corresponding extension frame in a direction that is orthogonal to a length of the rearwardly extending extension frame.

12. The beach cleaner according to claim 11, wherein the mesh member is shiftable relative to the frame in a front-rear direction.

13. The beach cleaner according to claim 11, further comprising a pair of front ski support pipes disposed on a front portion of the frame, and a pair of rear ski support pipes connected to a rear portion of the frame, wherein each of the front ski support pipes is disposed further away from a center line of the frame than each of the rear ski support pipes, and wherein the front ski support pipes and the rear ski support pipes having lengths which are parallel to each other.

14. The beach cleaner according to claim 12, further comprising a front end stopper and a rear end stopper adapted to be shiftable in a front-rear direction along lengths of the longitudinal members for determining positions of a front end and a rear end of the mesh member.

15. The beach cleaner according to claim 11, wherein a front portion of the mesh member is slightly inclined forwardly.

16. The beach cleaner according to claim 11, wherein the mesh member includes a first mesh section, a second mesh section, and a third mesh section arranged one after another from front to back in the longitudinal direction of the frame, and further comprising a left lift arm disposed adjacently to a left side of the third mesh section, and a right lift arm disposed adjacently to a right side of the third mesh section.

17. The beach cleaner according to claim 11, wherein the mesh member is rotatable about a hinge pipe in a direction orthogonal to the traveling direction.

18. The beach cleaner according to claim 11, further comprising lift arms extending laterally outward from left and right ones of the plurality of longitudinal members; and a hinge pipe mounted on a U-shaped hinge bracket fixed on one of the lift arms, about which the mesh member is rotatable, and when the mesh member is rotated to a upright position for emptying the mesh member a side wall of the mesh member rests against at least one of the lift arms.

19. The beach cleaner according to claim 11, further comprising a hinge on one of a left or a right side of the mesh member, and a handle on the other of the left and right side of the mesh member.

* * * * *